United States Patent [19]

McLandrich et al.

[11] Patent Number: 5,341,205
[45] Date of Patent: Aug. 23, 1994

[54] METHOD FOR CHARACTERIZATION OF OPTICAL WAVEGUIDE DEVICES USING PARTIAL COHERENCE INTERFEROMETRY

[75] Inventors: Matthew N. McLandrich; Donald J. Albares; Stephen A. Pappert, all of San Diego, Calif.

[73] Assignee: The United States of America as represented by the Secretary of the Navy, Washington, D.C.

[21] Appl. No.: 643,385

[22] Filed: Jan. 15, 1991

[51] Int. Cl.[5] .......................... G01B 9/02; G01N 21/84
[52] U.S. Cl. .................................. 356/73.1; 356/357; 356/358
[58] Field of Search ............. 356/73.1, 355, 356, 356/357, 358, 359

[56] References Cited

U.S. PATENT DOCUMENTS

| | | | |
|---|---|---|---|
| 4,759,627 | 7/1988 | Thylen et al. | 356/345 |
| 4,763,974 | 8/1988 | Thaniyavarn | 356/345 X |
| 4,767,210 | 8/1988 | Kashyap | 356/345 |
| 4,789,240 | 12/1988 | Bush | 356/345 |
| 4,824,251 | 4/1989 | Slotwinski et al. | 356/358 X |
| 4,881,813 | 11/1989 | Koo et al. | 356/345 |
| 4,889,986 | 12/1989 | Kersey et al. | 356/345 X |

FOREIGN PATENT DOCUMENTS

| | | | |
|---|---|---|---|
| 52-4256 | 1/1977 | Japan | 356/357 |
| 63-193003 | 8/1988 | Japan | 356/356 |
| 1-143931 | 6/1989 | Japan | 356/73.1 |
| 2-167411 | 6/1990 | Japan | 356/358 |

Primary Examiner—Vincent P. McGraw
Attorney, Agent, or Firm—Harvey Fendelman; Thomas G. Keough

[57] ABSTRACT

An optical system and method include a short coherence length edge, emitting LED, a fiber optic coupler probe, and a Michelson interferometer to measure the parameter of thickness of optical devices, such as thin silicon substrate samples and to characterize other parameters of optical waveguide devices such as absolute attenuation, effective refractive index, and changes in these parameters with the application of a modulation voltage or an external disturbance. The measurable thickness range from a few to hundreds of microns with a thickness precision exceeding 0.1 micron for a 10 micron sample. In situ localized measurements of samples in an etching chamber are obtainable to control processing and provide for thickness uniformity. Attenuation measurements for optical waveguides compare the values of interferogram maxima at the values of the reference arm path length to changes corresponding to one and two times the optical path length of the sample. Effective refractive index is determined by counting the number of fringes in the recorded interferogram between successive maxima. Changes in these parameters due to an external disturbance are measured by comparing the interferograms before and after. The sample stays in the system during all measurements which can also indicate the degree of coupling or interaction between simultaneous refractive index and absorption changes.

30 Claims, 13 Drawing Sheets

METHOD FOR CHARACTERIZATION OF OPTICAL WAVEGUIDE DEVICES USING PARTIAL COHERENCE INTERFEROMETRY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Numerous semiconductor waveguide devices, such as optical loss and phase modulators, are used in association with laser diodes to perform a wide variety of applications in optical communication and signal processing systems. The waveguide devices may be made by epitaxially depositing on a substrate a series of thin layers of semiconductor such as III-V compound semiconductor materials of the appropriate compositions. Channel waveguides are formed in the layers by using standard processing techniques.

An example of an emerging technology where precise measurements are needed is in the processing of silicon substrates which may require back surface thinning of the substrate after micro-circuitry has been fabricated on the front surface. Since the thinning has been accomplished by means of an etching technique which must be controlled precisely, designers and fabricators need to be able to measure the substrate thickness during the etching process. Because of reliability and satisfactory operational considerations, this need becomes more acute so that the final thickness variations of the etched silicon substrate must be with an accuracy on the order of 0.1 microns.

In addition to knowing thickness measurements for the silicon substrate application it is important to know the optical property characterizations of waveguide devices which will affect their performance. Various methods have been used to measure the parameters of optical waveguides and waveguide modulators. All have been noted to have deficiencies and limitations and, furthermore, no single measurement system can be used to determine all of the relevant device parameters.

For example, attenuation measurements have been made by coupling an optical signal into and out of a waveguide using a pair of coupling prisms, see the article by F. Zernike et al. appearing in the *Journal of Optical Society of America* 61, p. 678 (1971). The optical power coupled out of the waveguide was measured at a particular position along the waveguide. The prism was then moved along the waveguide a certain length and the output power again was measured. By measuring the length change between the two measurement points, a value could be obtained for the attenuation of the waveguide. Discrepancies could arise due to changes which might occur in the output coupling, which is very sensitive to the positioning of the prism with respect to the waveguide. In addition, because of the relatively large size of the coupling prisms, this method is limited to rather long waveguides, those being on the order of centimeters. Another contemporary attenuation measurement method utilizes a detector probe which is scanned along the length of the waveguide to measure the scattered optical power as a function of length, see the article by J. E. Goell, appearing in the *Proceedings of the IEEE* 58, p. 1504 (1970). The recording of scattered power versus length is used to obtain a value for the waveguide attenuation. However, a certain degree of unreliability could creep in if the scattering in the waveguide is not uniform along its length. A third known method of measuring waveguide attenuation is more suited to short-length waveguides and uses a Fabry-Perot interferometer configuration, a highly coherent source, and temperature or electro-optic tunings to vary the index of refraction, see the article by Y. Matsui et al. appearing *SPIE* Vol. 651, p. 263 (1986). This measurement system is complex and requires a somewhat involved interpretation of the measurement results to yield an attenuation figure.

The measurements of the absolute effective index of semiconductor waveguides and changes in the index due to applied modulations and external disturbances appear to be not well developed. Changes in the index can be measured by placing the waveguide sample in a Mach-Zehnder interferometer configuration, applying the modulation or external disturbance, and counting interference fringes such as that described in the article by H. Soga et al., appearing in *Electronics Letters* (1988). The method of the article is limited to only measuring the change in index.

Thus, continuing need exists in the state of the art for a partial coherence interferometer used to demonstrate accurate measurements of the waveguide parameters of attenuation, effective index and changes in attenuation and effective index with applied modulation fields and external perturbations. Another application is to provide a precise measurement of thickness of substrates that lends itself to in-situ measurements during processing.

SUMMARY OF THE INVENTION

The present invention is directed to providing an apparatus and method of characterizing parameters of an optical waveguide having a front partially reflective surface and a back partially reflective surface. The characterizing is at least one of the parameters of absolute attenuation, effective refractive index, changes of these parameters with the application of a modulation voltage or an external disturbance, as well as providing the effects of interactions between absolute attenuation and effective refractive index with the application of a modulation voltage or an external disturbance. Another use is to determine the thickness of a substrate. Energy is emitted from an optical source having a central emission wavelength $\lambda_o$ with a predetermined coherence length $l_c$ related to the width of its spectral energy wavelength distribution $\delta\lambda$ by the relation $l_c = 1/\delta\sigma = \lambda_o^2/\delta\lambda$. The partially coherent energy is emitted from a coupler probe coupled to the optical source onto the optical waveguide. The partially coherent energy is reflected from the front partially reflective surface and the back partially reflective surface and transmitted via said coupler probe. The reflected partially coherent energy from both the front partially reflective surface and the back partially reflective surface is received in a Michelson interferometer including optical components defining two optical paths. Interference signals are created in the Michelson interferometer that are representative of interference between the reflected partially coherent energy from the front partially reflective surface and the back partially reflective surface in the two optical paths, the two optical paths each have a length that differs one from the other by an amount $\Delta p$ having a maximum value of $l_c$. Interference is indicated by an optical detector coupled to receive the interference signals to thereby assure characterizing the parameters of the optical waveguide. The coherence length of the source cannot exceed a round trip optical path length in the optical waveguide which is equal to 2 nl where l is the distance between the front partially reflective surface and the back partially reflective surface and n is the refractive index of the optical waveguide.

An object of the invention is to provide an optical system for performing parameter characterizations of optical waveguides and thickness measurements of structures such as thin silicon substrate samples.

Another object is to provide an optical system for measuring the dimensions of samples with a precision approaching 0.1 micron.

Another object is to provide an optical system for measuring substrate thicknesses between a few to hundreds of microns.

Another object is to provide an optical system adaptable for in-situ measurements of samples within a processing chamber to control the manufacturing process.

Yet another object is to provide an optical system enabling localized measurements at selected positions across the area of a sample to assure uniformity control.

Another object is to provide for the measurement of semiconductor waveguide device parameters using the recorded interferogram of the sample in a Michelson interferometer.

Another object is to provide for a characterization of waveguide attenuation.

Another object is to provide for a characterization of the effective index of a waveguide.

Another object is to provide for an optical system for characterizing of change in waveguide absorption and index.

Another object is to provide an optical system having the capability to determine modulation efficiency, waveguide absorption and effective index with the same system.

Still another object is to provide an optical system providing for an observation of the interaction between changing waveguide parameters brought about by external causes, such as, applied voltage or physical influences.

Still another object is to provide an optical system which is nondestructive of the sample while obtaining characterizations of dimension, attenuation and waveguide absorption.

Still another object is to provide an optical system capable of accommodating a wide variety of optical waveguide structures and systems.

These and other objects of the invention will become more readily apparent from the ensuing specifications and drawings when taken in conjunction with the appended claims.

DESCRIPTION OF THE PREFERRED EMBODIMENTS

Figure 6:
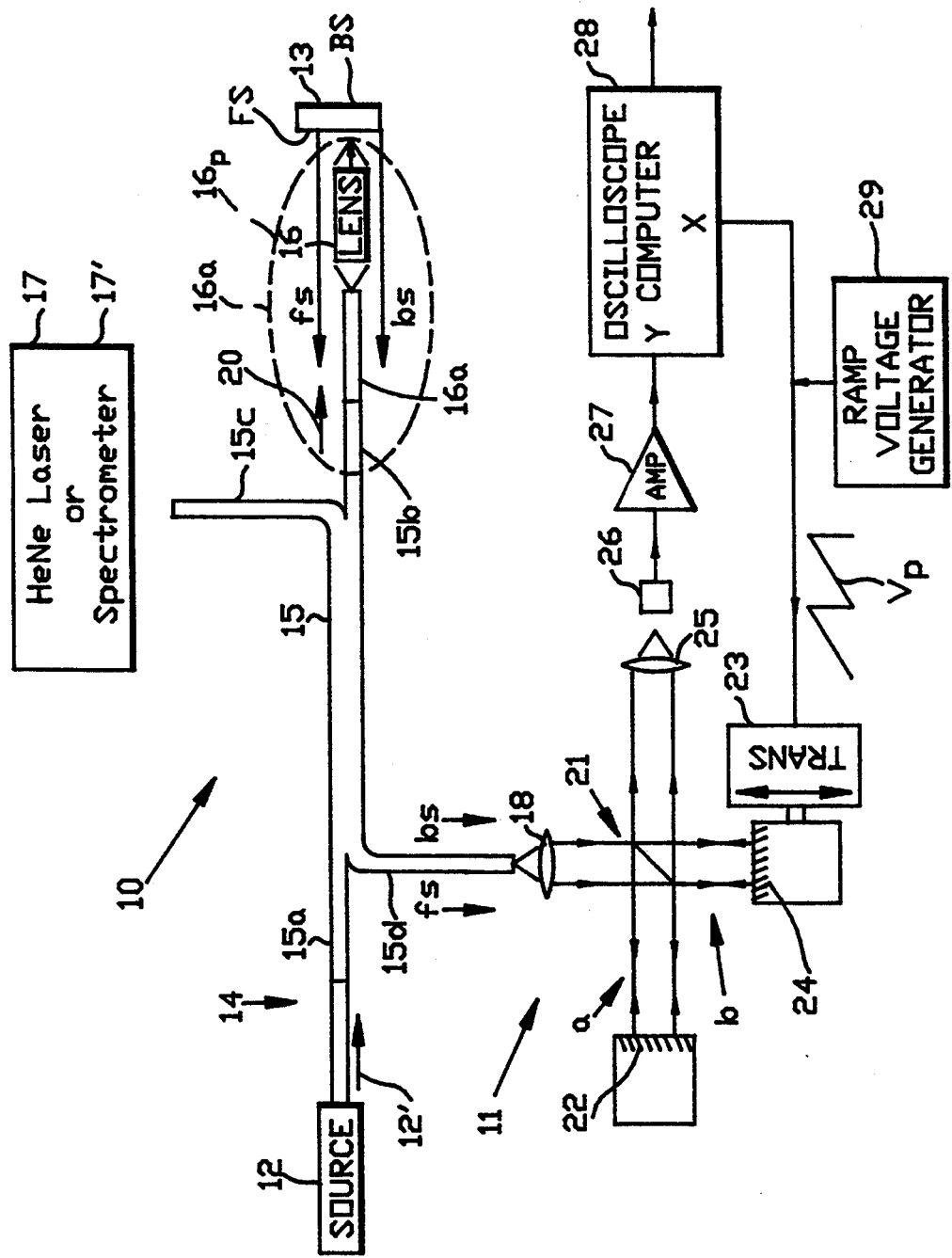
FIG. 6 is an experimental configuration for the measurement of substrate sample film thickness using an optical fiber coupler probe, a Michelson interferometer and a partially coherent source.
Figure 13:
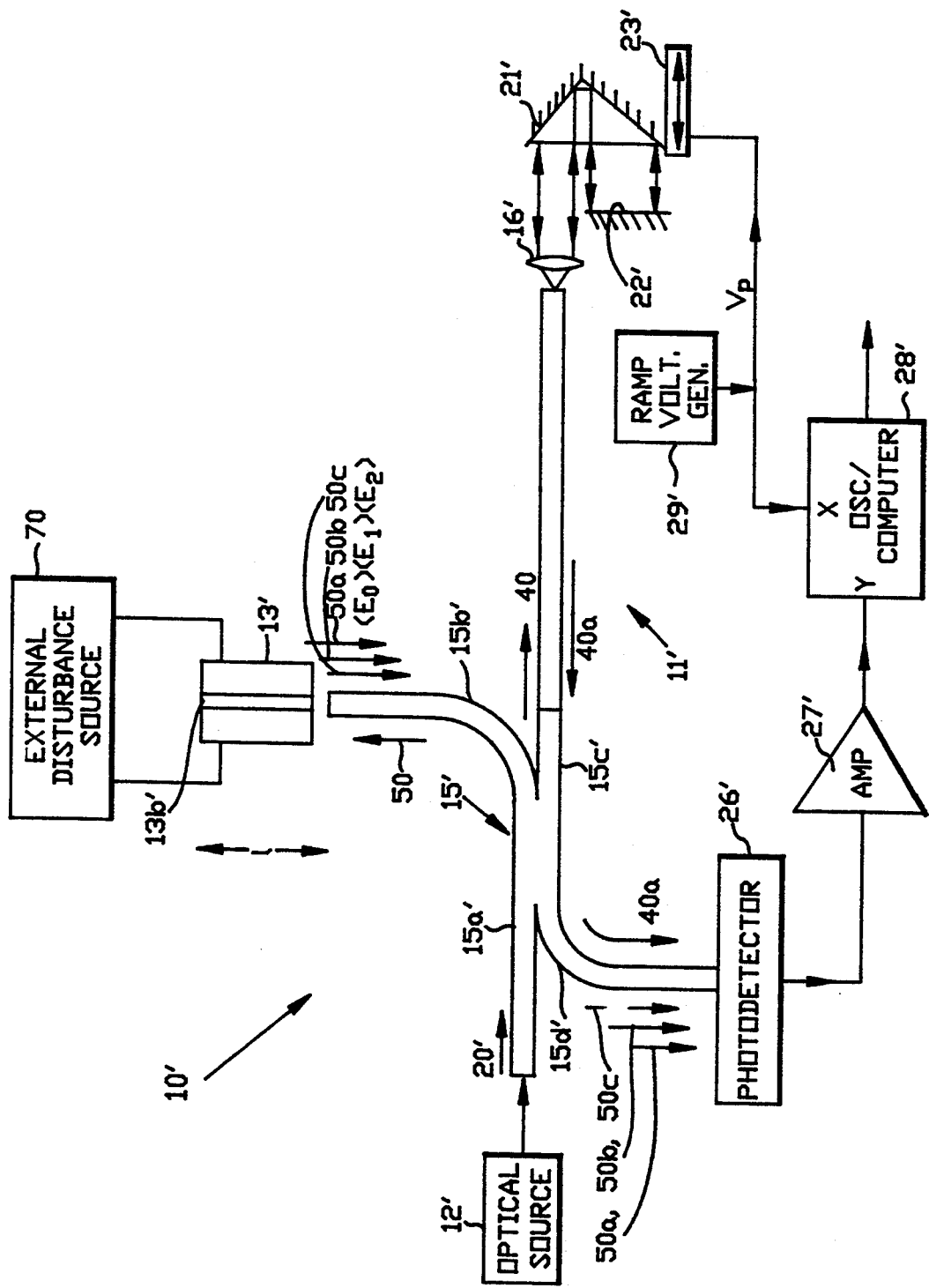
FIG. 13 is another configuration of the optical system.

Referring now to FIGS. 6 and 13 of the drawings, two embodiments of an optical system 10 and 10' have been designed to respectively demonstrate the capability for an accurate measurement of a thickness of a sample 13, a thin silicon substrate, for example, and, for a sample 13', characterizing the waveguide parameters of attenuation, effective index and changes in these parameters with an applied modulation field and/or external perturbations.

Before proceeding with the description, a listing of abbreviations and partial definitions herein is provided to aid in a thorough understanding of this inventive concept.

$E(\sigma)$ = interferometer output optical field
$E_s(\sigma)$ = source optical field
$E_{fs}$ = optical field from sample front surface
$E_{bs}$ = optical field from sample back surface
$l_c$ = source coherence length n = phase index of refraction of the sample material
$n_g$ = group index of refraction of the sample material
$n_{go}$ = group index of refraction of the sample material at $\sigma = \sigma_o$
$n_o$ phase index of sample material for $\sigma = \sigma_o$
$n_o'$ = derivative of phase index for $\sigma = \sigma_o$
N = number of interferogram fringes between primary and secondary maxima
$p_1$ = optical path length of (first) wave-packet
$p_2$ = optical path length of (second) wave-packet
$p_t$ = differential length between the interferometer arms
t = thickness of the sample to be measured
t = optical field transmittance at sample/air interface
$V_d$ = photodetector output voltage
$V_p$ = voltage applied to interferometer transducer
$\alpha$ = absorption coefficient of silicon
$\delta v$ = width of spectral energy distribution in wavenumbers
$\delta\lambda$ = spectral width of source in wavelength units (nm or $\mu$m)
$\Delta p$ = path length difference between optical wave packets
$\Delta\lambda$ = period of spectral structure in wavelength units
$\Delta\sigma$ = period of spectral structure in wavenumber units
$\lambda$ = wavelength of optical field (nm or $\mu$m)
$\lambda\sigma$ = man wavelength of source distribution
$\sigma$ = wavenumber of optical field ($\mu m^{-1}$)
$\sigma_o$ = mean wavenumber of source distribution Referring to FIG. 6, a partial coherence interferometer designation is applied with respect to the description of the configuration of optical system 10 that is adapted to measure the thickness of sample 13, from a few to hundreds of microns. This capability enables numerous, if desired, in-situ measurements of the sample during a fabrication process to aid in control and uniformity of the finished product.

Partial coherence exists in an interferometric system whenever an optical source 12 cannot be considered purely monochromatic, that is, it has a spectral distribution with a bandwidth (in wavenumbers) which is comparable to the inverse of the differential path length of the optical beams which propagate in an interferometer, in the case of FIG. 6, a Michelson interferometer configuration 11.

Figures 1A, 1B:
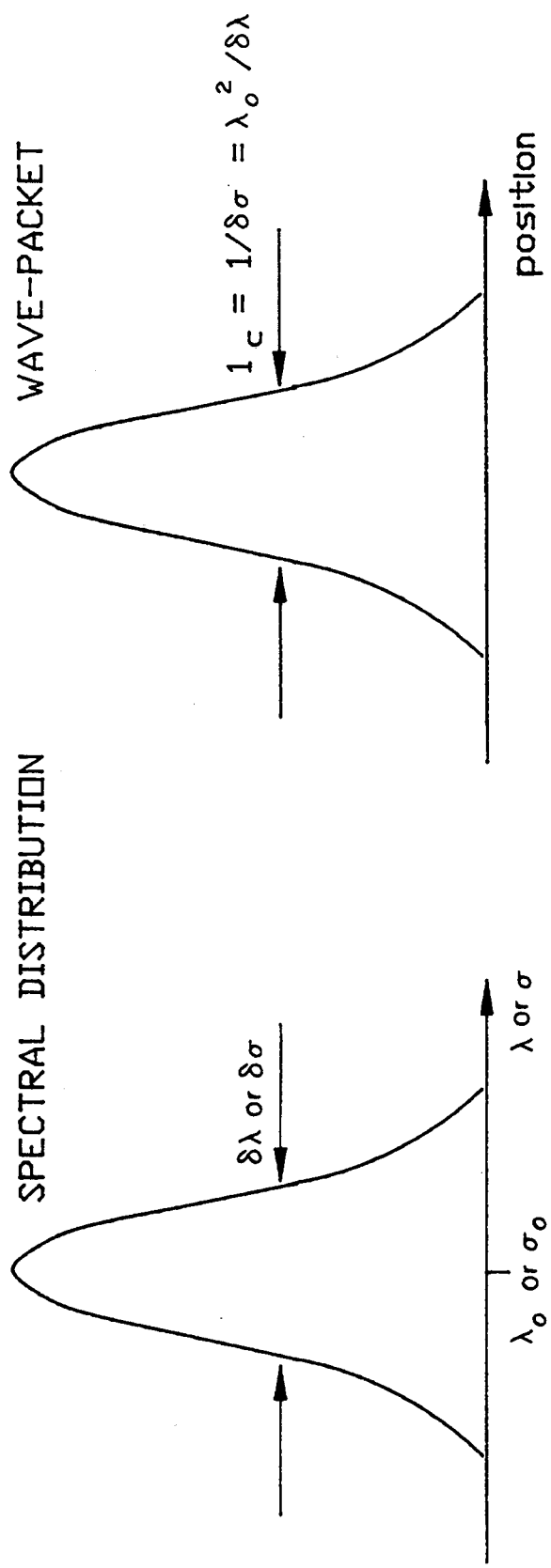
FIGS. 1A and 1B depict an optical source spectral energy distribution and wave-packet emission representation of source output. Coherence length $l_c$ of source is determined by spectral width $\delta\lambda$.

The spectral distribution is characterized by a central wavelength $\lambda_o$ and a spectral bandwidth $\delta\lambda$, or alternatively, in wavenumbers by $\sigma_o = 1/\lambda_o$ and $\delta\sigma = \delta\lambda/\lambda_o^2$, see FIG. 1. The coherence length $l_c$ of source 12 is a measure of the distance over which two beams, or wave-packets, which are derived from the source by means of amplitude division, will produce high visibility interference fringes when they are recombined. The expression for $l_c$ in terms of the spectral parameters is $$l_c = 1/\delta\sigma = \lambda_o^2/\delta\lambda \tag{1}$$

The relationship between source bandwidth, coherence and fringe visibility is shown schematically in FIG. 2, where the output 12' from source 12 is represented by a wave-packet of length $l_c$. The wave-packet is divided into two equal amplitude waves which are then recombined after traversing optical path lengths which differ by an amount $\Delta p$, (an optical system which can perform this function is Michelson interferometer 11 which is described below).

Figure 2A:
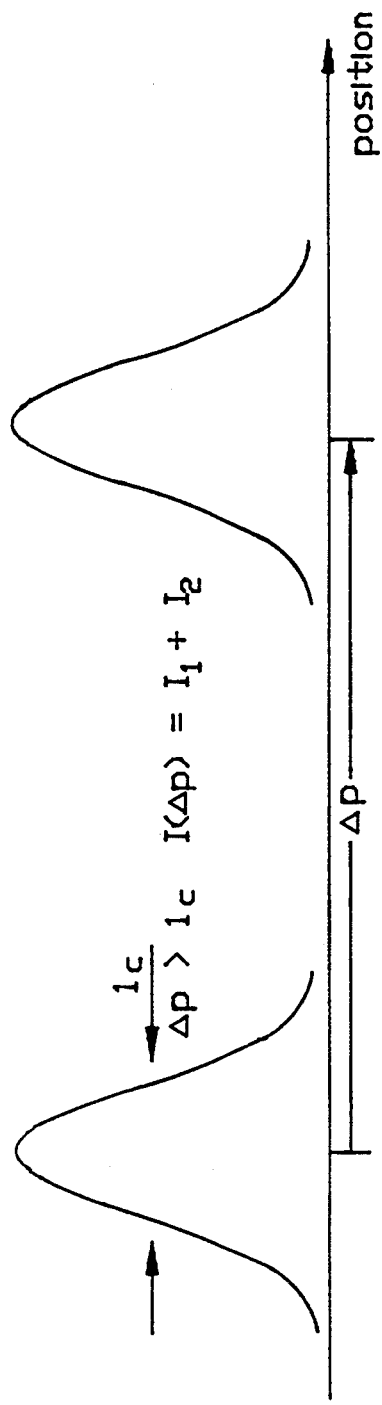
FIGS. 2a and 2b show recombination of amplitude divided wave-packet from source with path difference between waves $\Delta p > l_c$ and path difference $\Delta p < \sim l_c$, respectively.
Figure 2B:
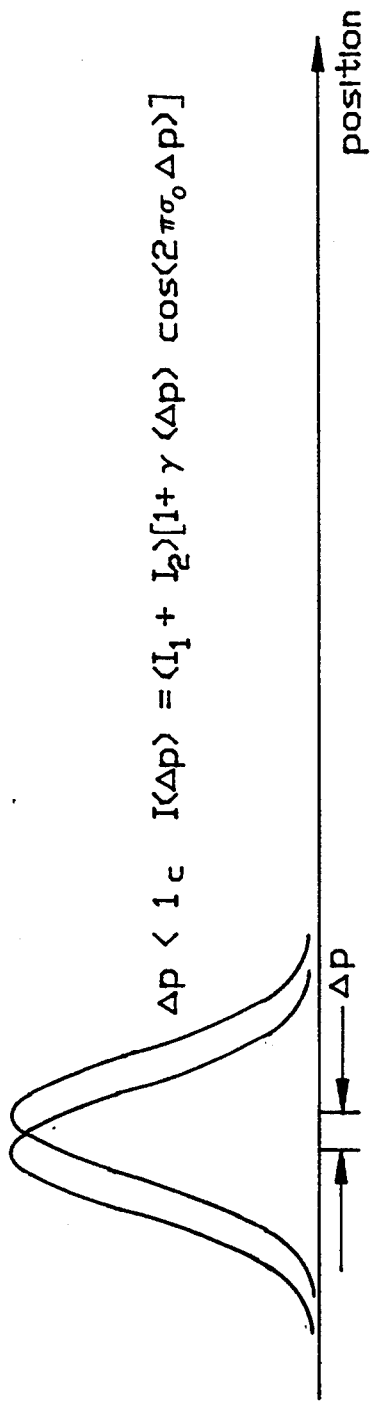

In FIG. 2a, the waves are shown as having traveled over optical paths which differ by an amount $\Delta p$ which is greater than the coherence length of the source. In this case, there is no longitudinal spatial overlap of the wave packets when they are recombined, and the beams are incoherent with an intensity equal to the sum of the individual wave intensities. If the waves traverse optical paths which differ by an amount $\Delta p < l_c$, then there is longitudinal spatial overlap and the waves are partially coherent when they are recombined. In this case, shown in FIG. 2b, the intensity depends on the phase difference between the waves which is proportional to the optical path difference. (Complete coherence exists only for $\Delta p = 0$).

As the path difference $\Delta p$ is increased from 0, the intensity will vary in a cosinusoidal way, with a continuously decreasing amplitude. This amplitude factor is a function of $l_c$ and also of $\Delta p$, and is known as the fringe visibility, see H. H. Hopkin's "Theory of Coherence", *Advanced Optical Techniques*, Van Heel, A. C. S. ,editor, John Whiley & Sons, Inc., New York, 1967 p. 232, or mutual coherence function Y, see W. T. Cathey, *Optical Information Processing* John Whiley & Sons, Inc., New York, 1974. p. 78. This function is determined by the spectral distribution of the source, and therefore source spectral characteristics are a critical factor in the ability to measure sample thickness using Michelson interferometry.

As an example of the interference of waves produced by a source with an extended spectral distribution, a Gaussian distribution is considered here. If the source optical field is represented by the function $E_s(\sigma)$, the field produced by the interfering beams for a wavenumber component $\sigma$ at a time t is $$E(\sigma) = Re\{\tfrac{1}{2}E_s(\sigma) (\exp[i(2\pi\sigma p_1 - \omega t)] + \exp[i(2\pi\sigma p_2 \omega t)])\} \tag{2}$$

where $p_1$ and $p_2$ are the optical paths of the two waves. It is assumed that the components of the field have the same polarization and that the optical paths are in a non-dispersive medium. It has also been assumed that the source can be treated as a point source, and that there is no angular misalignment between the interfering waves. Under these conditions there is no transverse spatial variation of $E(\sigma)$. The time averaged intensity for a particular wavenumber component of the source is then given by $$I(\sigma) = |E(\sigma)|^2 = \tfrac{1}{2}|E_s(\sigma)|^2[1 + \cos(2\pi\sigma\Delta p)] \tag{3}$$

where $\Delta p = p_1 - p_2$. The total intensity is found by integrating the intensities resulting from each component of the source spectrum. The total time averaged intensity is then given by $$I_t(\Delta p) = \int I(\sigma)d\sigma = \tfrac{1}{2}\int|E_s(\sigma)|^2 d\sigma + \tfrac{1}{2}\int|E_s(\sigma)|^2 \cos(2\pi\sigma\Delta p)d\sigma \tag{4}$$

The first term above is a constant and represents the background intensity level which is equal to half the source intensity, or equivalently $I_t(\infty)$. The second term varies with respect to the path difference $\Delta p$, and for non-dispersive media it is simply the Fourier cosine transform of the source energy spectral distribution.

For a point source with a normalized Gaussian spectral distribution given by $$|E_s(\sigma)|^2 = (1/\delta\sigma)\exp[-\pi\{(\sigma - \sigma_o)/\delta\sigma\}^2] \tag{5}$$

the normalized intensity as a function of $\Delta p$ is from equations (4) and (5)

$$I_i(\Delta p) = \tfrac{1}{2}[1 + \exp[-\pi(\Delta p \delta \sigma)^2] \cos(2\pi \sigma_o \Delta p)] \qquad (6)$$

From this expression, the general observations which were made above regarding the interference intensity are confirmed. First, in regions of non-zero fringe visibility (i.e., $\Delta p < \sim 1/\delta\sigma$), the intensity varies as the cosine of a term proportional to the optical path difference $\Delta p$, and with a period equal to the mean wavelength of the source distribution, $\pi_o = 1/\sigma_o$. Second, the fringe visibility decreases as the optical path length difference $\Delta p$ increases. Also, the extent of the fringe visibility is correlated to the quantity $l_c$, the coherence length of the source, which is equal to the inverse of the spectral width of the source $l_c \simeq 1/\delta\sigma$.

Figure 3:
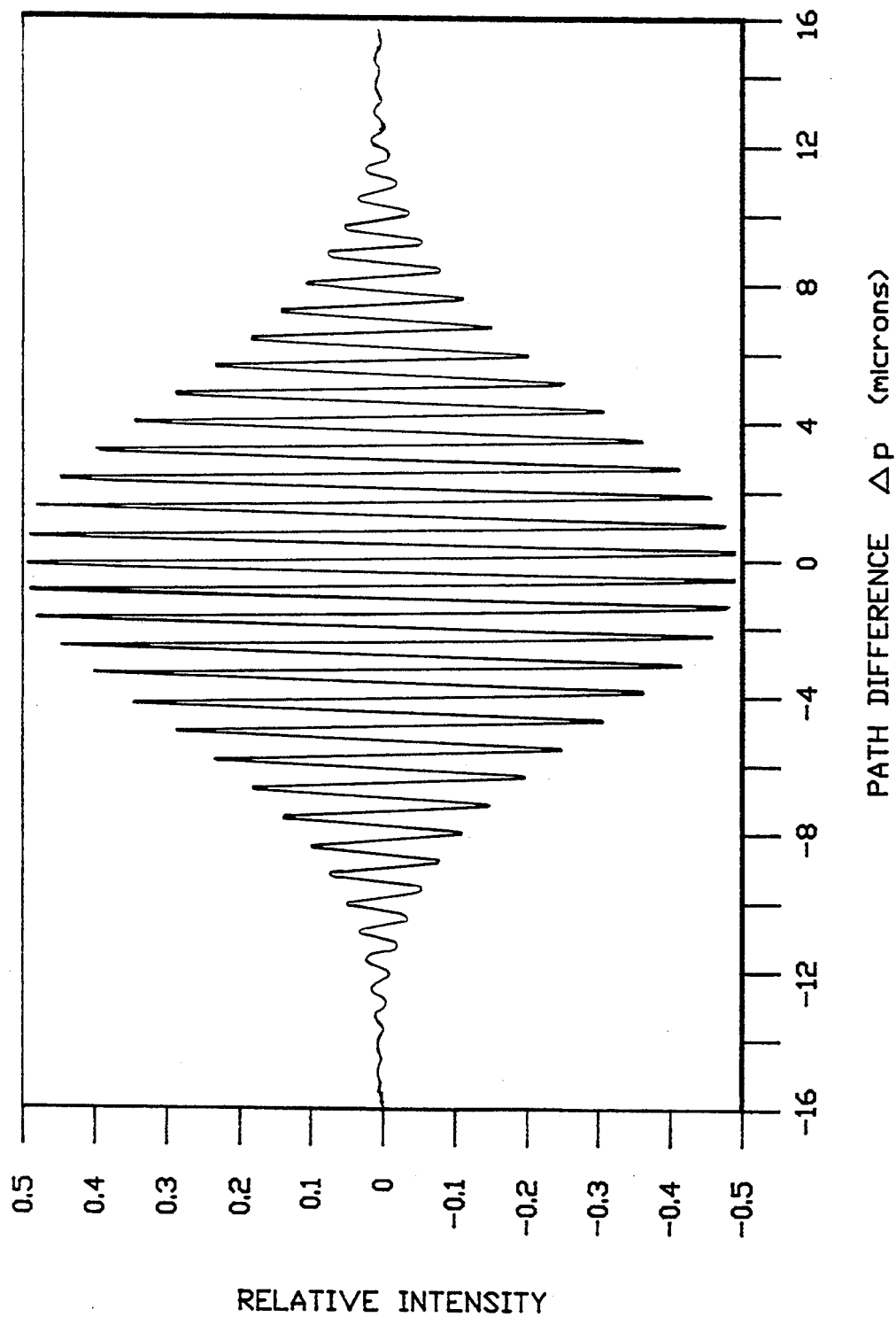
FIG. 3 is a source interferogram calculated for a Gaussian spectral distribution source. Assumed parameters are $\lambda_o = 830$ nm and $\delta\lambda = 60$ nm.

FIG. 3 is a plot of the variable intensity term in equation 6, as a function of $\Delta p$. This type of graph can be produced by a scanning Michelson interferometer, and is known as the source interferogram. The source parameters used in equation 6 to generate this plot are $\lambda_o = 830$ nm and $\delta\lambda = 60$ nm.

Figure 4A:
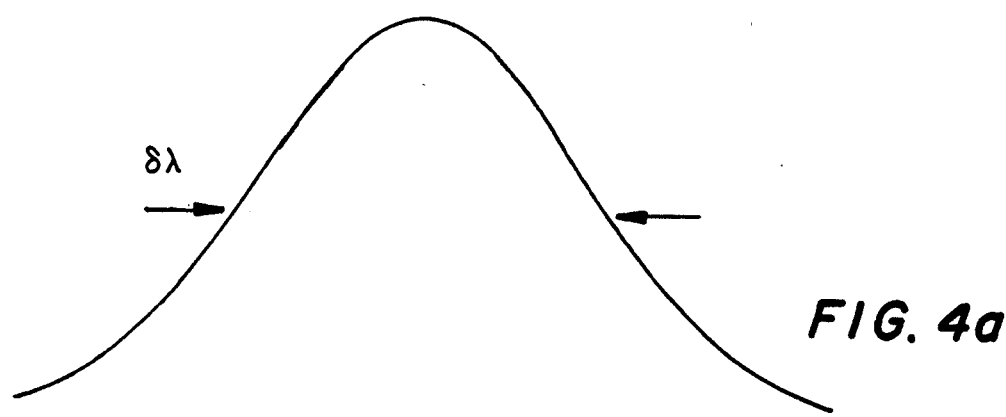
FIGS. 4a, 4b and 4c are spectral distributions for (a) a pure Gaussian source, (b) a Gaussian with periodic structure superimposed, and (c) a Gaussian with asymmetric periodic structure superimposed, respectively.
Figure 4B:
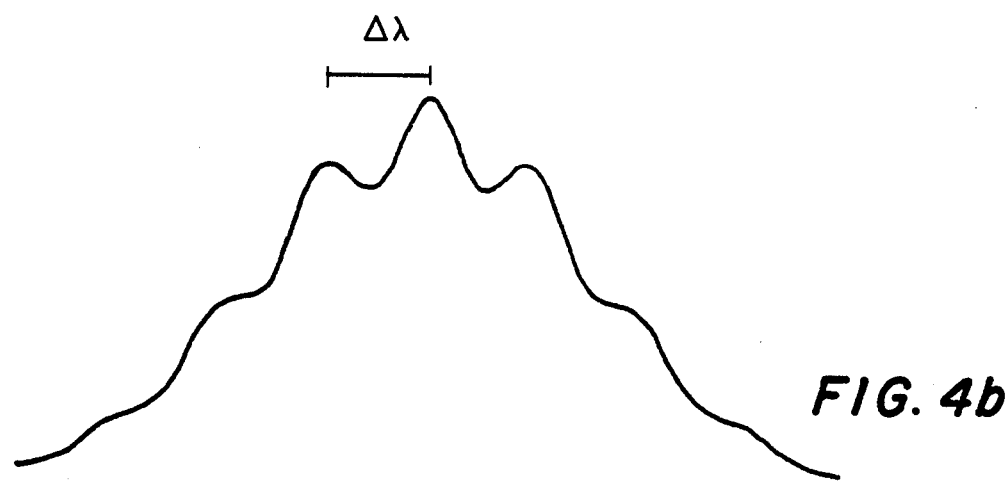
Figure 4C:
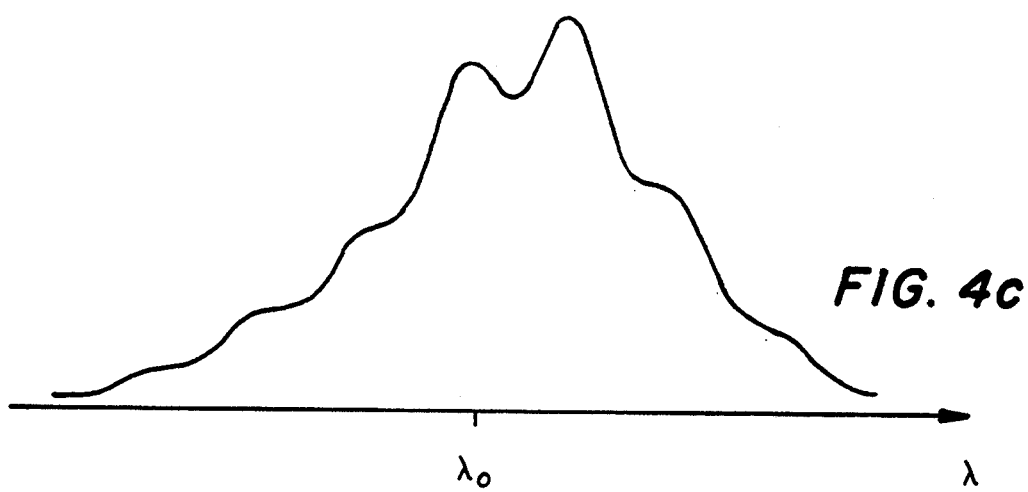
Figure 5A:
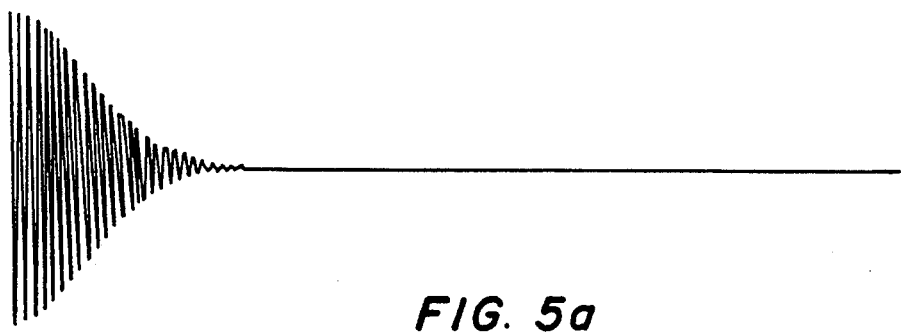
FIGS. 5a, 5b and 5c show source interferograms calculated for the source spectral distributions in FIGS. 4a, 4b and 4c, respectively.
Figure 5B:
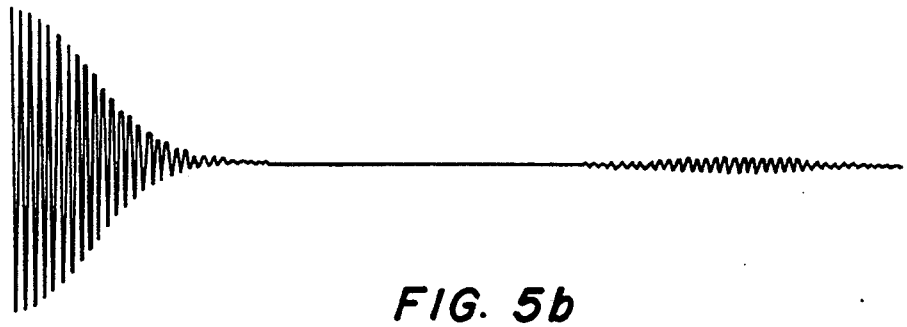
Figure 5C:
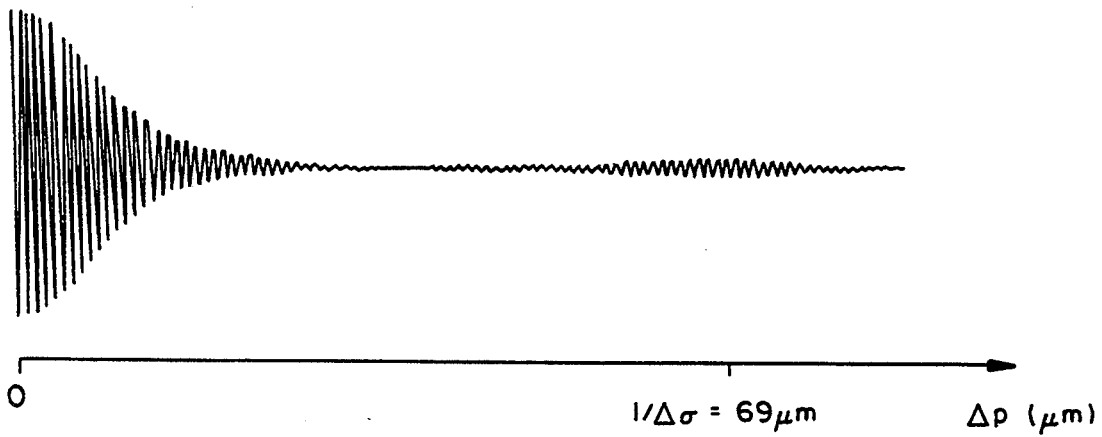

Although the above statements regarding the features of the interferogram are made for a source with a Gaussian distribution, they are true qualitatively for a general source. In practice, the source is not a true Gaussian, in that, it can exhibit structure and asymmetry in the spectrum. Asymmetry in the spectrum has the effect of extending the width of the visibility function, while periodic structure causes side lobes of appreciable visibility. These effects are shown in the plots in FIGS. 4a, 4b and 4c and 5a, 5b and 5c. Three different source spectral distribution curves are shown in FIGS. 4a, 4b and 4c, corresponding to a pure Gaussian, a Gaussian with symmetric periodic structure superimposed, and a Gaussian with asymmetric periodic structure. In both FIGS. 4b and 4c, the structure period is $\Delta\lambda = 10$ nm, or in wavenumbers, $\Delta\sigma = 0.0145$ $\mu m^{-1}$. Each distribution has the same total spectral width of $\delta\lambda = 40$ nm and a central wavelength of $\lambda_o = 830$ nm. The corresponding source interferograms for positive values of the path difference are shown in FIGS. 5a, 5b and 5c. As seen in FIG. 5b, the visibility for the symmetric distribution with periodic structure is significantly increased for values of the path length difference in the region of $1/\Delta\sigma$. This is expected since the interferogram is just the Fourier cosine transform of the spectral distribution. Similar results are evident for the asymmetric case in FIG. 5c. In addition, it is observed that the envelopes near 0 and $1/\Delta\sigma$ are broadened due to the asymmetry. Note that in both cases, although the visibility function is modified, the period of the fringes remains at the mean wavelength. These effects of spectral structure and asymmetry must be taken into account when measurements of film thickness are made using partial coherence interferometry. This point is further explored below.

Referring now to FIG. 6 of the drawings, optical system 10 provides an interferogram that is obtained from a Michelson interferometer configuration 11 using a partial coherence source 12 that is used to perform measurements of the thickness of a thin silicon substrate sample 13, although it is recognized that other semiconductors, waveguides and the like, would lend themselves to this thickness measurement technique. Partially coherent source 12 is a commercially available edge-emitting, light-emitting diode (ELED) packaged in a hermetic housing and coupled to provide an output 12' to a multi-mode fiber pigtail 14. The hermetic housing contains a thermal electric cooler and a thermistor for temperature (and wavelength) stabilization so that partial coherence source 12 emits its output 12' in a wavelength region near 0.83 microns with a spectral width of about 40 nm. The exact spectral energy distribution depends on the temperature and the operating current and will be elaborated on below.

Fiber pigtail 14 is spliced to an input port 15a of a multi-mode fused fiber bi-directional coupler 15. The coupler is a 3 dB (or 50/50) optical power splitter at 0.83 microns. An output coupler port 15b with an interconnecting fiber directs wave packet 20 with an amplitude of $E_s(\sigma)$ to graded index rod lens 16, that can include a length of optical fiber 16a to function as a selectably locatable coupling probe 16p, and, where, optionally, its output is either collimated or focused onto sample 13 which is to be evaluated. A second coupler output port 15c can be used as an input port for a visible wavelength (HeNe) laser 17 which may be used to align interferometer portion 11 of optical system 10 or, in the alternative, port 15c (with its interconnecting fiber) can be coupled to a spectrometer 17' for monitoring the source spectral properties during a measurement. In either case, whether a laser 17 or a spectrometer 17' is selected, these two features help assure a reliable determination of the thickness t of sample 13.

The optical beam, or wave packet 20 impinging on sample 13 of thickness t is partially reflected and transmitted at the first surface FS of sample 13. Incident wave packet 20 is again partially reflected in a beam or wave packet at the back surface BS of sample 13. The front and back surface reflected wave packets fs and bs are coupled back into the lens 16 and 23 the fiber coupler 15. The amplitude of the FS and BS beams which are coupled into interferometer 11 are $E_{fs}$ and $E_{bs}$, respectively.

A multi-mode fiber coupler 15 allows the maximization of the input/output coupling efficiency of all the optical beams. This phenomena is discussed in an article by T. H. Bosselmann et al. entitled "High Accuracy Position Sensing with Fiber Coupled White Light Interferometers," in *PROC 2nd Int. Conf. Optical Fiber Sensors*, Stuttgart, FRG, September 1984, pp. 361–364, and by K. Takada et al. in their article "Trench Depth Measurement System for BLSI DRAM's Capacitor Cells Using Optical Fiber and Michelson Interferometer" appearing in *J. Lightwave Technology* Vol. LT-5, Number 7, July 1987, pp. 881–887. A single mode design might be selected, e.g., the by McLandrich design as shown in his U.S. Pat. No. 4,557,553.

Figure 7:
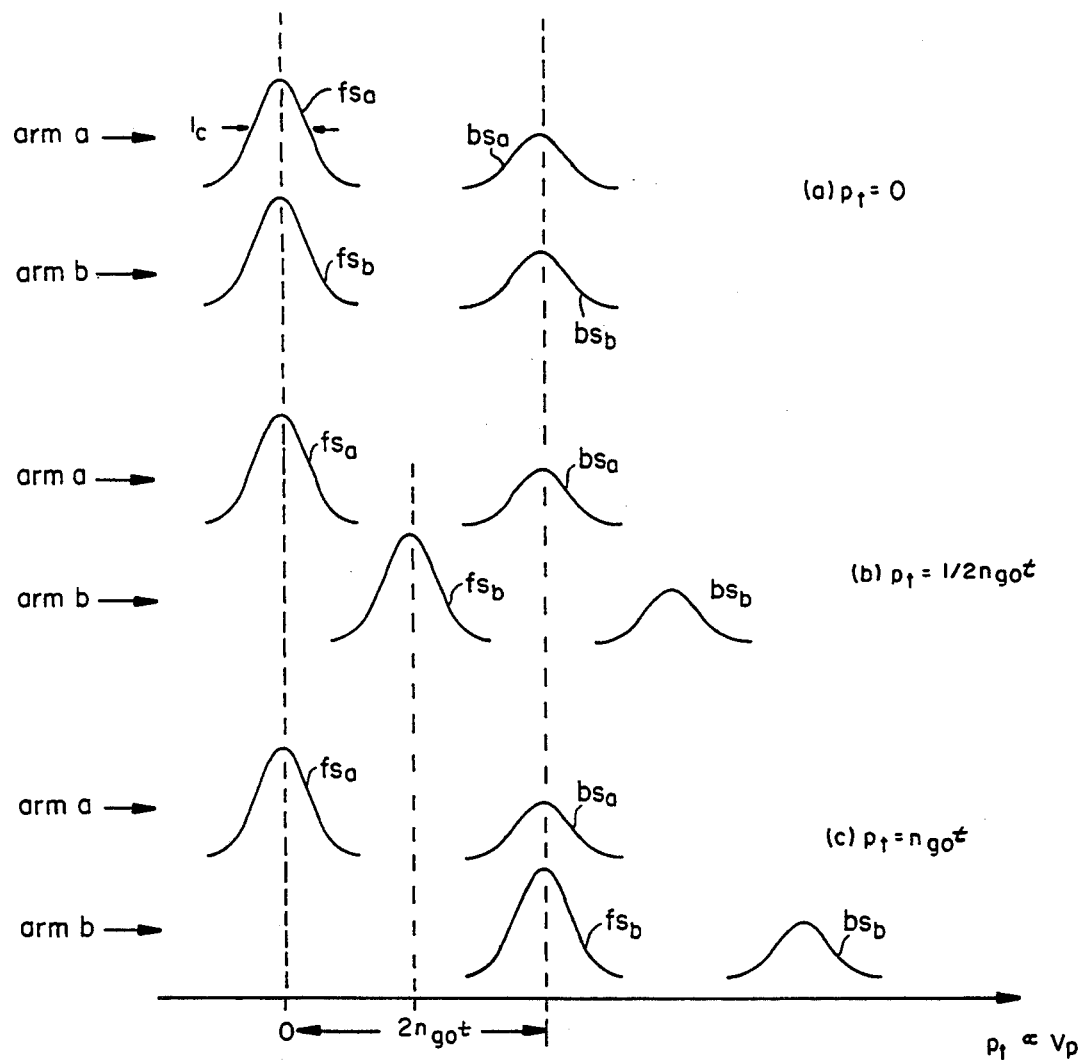
FIG. 7(a), (b), and (c) show relative delays of front surface and back surface reflected wave-packets from sample by means of Michelson interferometer variable piezoelectric transducer displacement $p_t$.

Referring once again to FIG. 6 in conjunction with FIG. 7, a fourth coupler port 15d of multi-mode fiber coupler 15 may be connected to a length of an optical fiber to transmit the sample reflected wave packets fs and bs through other components of Michelson interferometer portion 11. The two wave packets fs and bs, are divided by a Michelson beamsplitter into two sets of wave packets $fs_a$ and $bs_a$ and $fs_b$ and $bs_b$ which propogate in arms a and b, which includes the fixed mirror 22 in arm a and a moveable mirror 24 in arm b. The set of wave packets $fs_a$ and $bs_a$ that are split into arm a are not delayed but the set of wave packets $fs_b$ and $bs_b$ split into arm b are delayed with respect to the set of wave packets in arm a by the variable path length difference $p_t$ between the two arms of interferometer portion 11, i.e., one set is delayed with respect to the second set by the movement of moveable mirror 24 which is attached to piezoelectric transducer 23.

This path length difference ($2p_t$) is controlled by, and is proportional to, a voltage $V_p$ from a ramp voltage generator 22 which is applied to a linear piezoelectric transducer 23. The linear piezoelectric transducer reciprocates in the arrow directions indicated in response to and in proportion to the ramp voltage applied $V_p$ and accordingly displaces movable mirror 24. Consequently, noting FIG. 6, in arm b, set of wave packets $fs_b$ and $bs_b$ are reflected by movable mirror 24 and recombined at beamsplitter 21 which redirects them to a lens 25 that focusses them onto a photodiode detector 26 where set of wave packets $fs_a$ and $bs_a$ of arm a interferes with set $fs_b$ and $bs_b$ of arm b. The output current of photodiode detector 26 is proportional to the intensity of the interfering sets of wave packets $fs_a$ and $bs_a$ and $fs_b$ and $bs_b$ and is appropriately amplified in an amplifier 27.

The amplified voltage is displayed on an oscilloscope 28 as a function of $V_p$ (that is, $P_t$) or it may be converted to an appropriate digital signal and stored in a computer for further analysis. Linear ramp voltage $V_p$, that is applied to piezoelectric transducer 23 and the fringe intensity versus displacement is recorded to produce the sample interferogram. It is the information contained in this interferogram which enables the determination of the sample thickness t.

Figure 8:
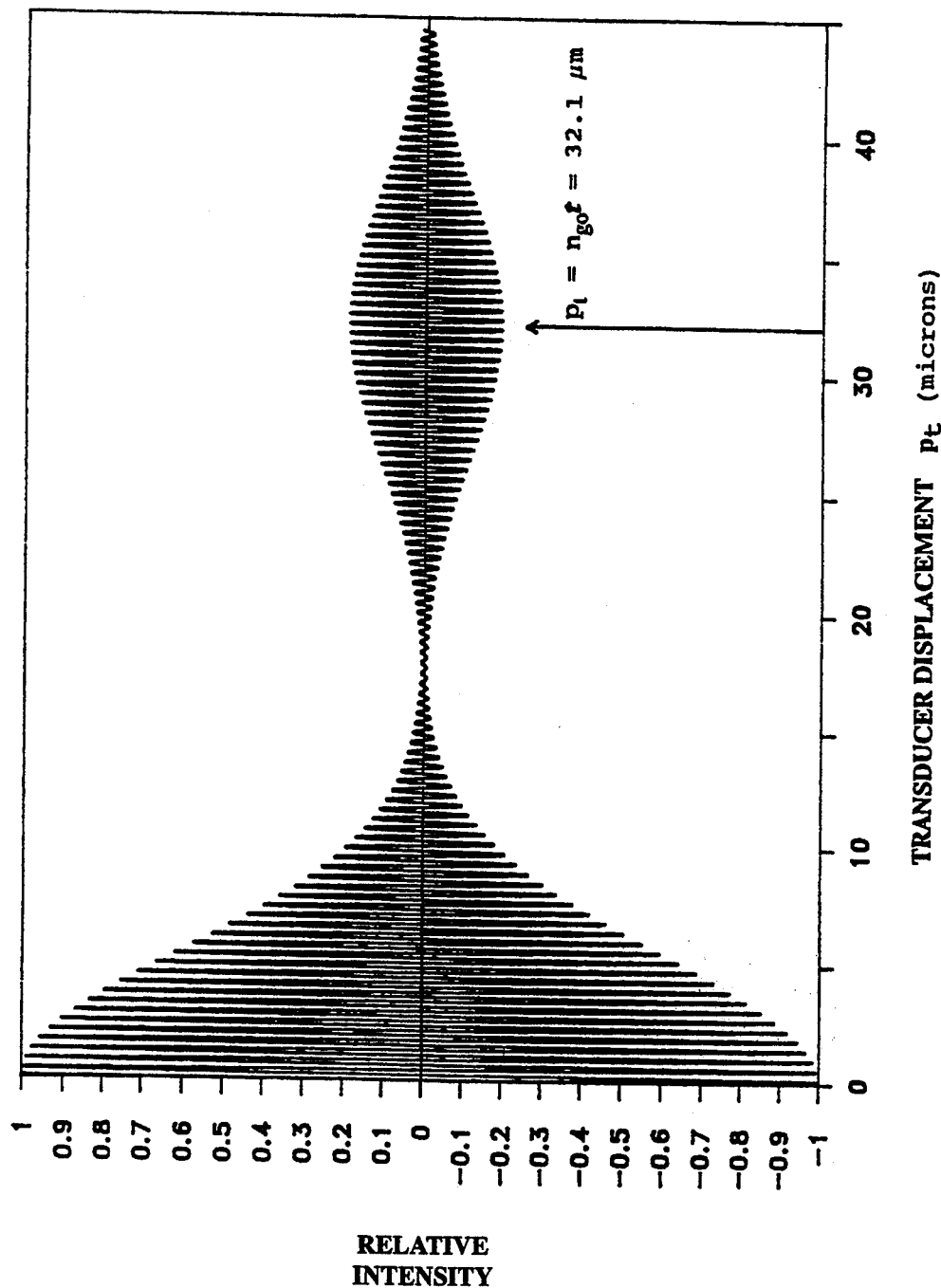
FIG. 8 shows a computer-generated sample interferogram. Assumed values are $\lambda_o = 0.83$ μm, $\delta\lambda = 25$ nm, and $t = 7.5$ μm.

The related computer-generated sample interferogram in FIG. 8 obtained from the reflected sample wave packets fs and bs provide a more complete realization of how optical system 10 derives the thickness t of sample 13. Reflected wave packets fs and bs are represented to have a width $l_c$ and are separated by the optical path difference $2n_{go}t$ between the sample front surface FS and back surface BS. (The optical path difference between wave packets generated by a spectrally distributed source is proportionate to a group index of refraction, not the phase index, see for example, *Optical Interferometry* by P. Hariharan, Academic Press, Orlando, Fla., 1985, p. 33). Here $n_{go}$ is the group refractive index of the sample material which is, in this example, silicon, and which has a value equal to 4.284 $\lambda_o=0.83$ microns, (this value for $n_{go}$ can be calculated using the phase index values for various wavelengths listed in Edward D. Palik's *Handbook of Optical Constants or Solids*, Academic Press, 1985, pp 547–569). For each of the three cases depicted in FIG. 7(a), FIG. 7(b) and FIG. 7(c), two sets of divided wave packets $fs_a$ and $bs_a$ and $fs_b$ and $bs_b$ are shown, corresponding to the divided sets of wave packet beams which respectively propagate in arm a between beamsplitter 21 and mirror 22 and arm b between beamsplitter 21 and mirror 24 of Michelson interferometer 11.

As $V_p$ is varied linearly from 0, reflected wave packet set $fs_b$ and $bs_b$ in arm b of the Michelson interferometer is proportionally delayed by an amount $2p_t$ with respect to the other see FIG. 7(c). At $V_p=0$, the displacement of piezoelectric transducer 23 is $p_t=0$ so that sets of wave packets $fs_a$ and $bs_a$ and $fs_b$ and $bs_b$ are coincident in space and, consequently, they interfere coherently with maximum fringe visibility, see FIG. 7(a). As $V_p$ is increased, the visibility decreases as a result of the reduced overlap of the sets of wave packets, see FIG. 7(b) (it is assumed that the source spectral width is such that the coherence length is less than the optical path difference between the front and back surfaces of the sample.

The visibility of the fringes reaches a minimum near $P_t=\tfrac{1}{2}n_{go}t$ where there is minimum overlap between the sets of wave packets $fs_a$ and $bs_a$ and $fs_b$ and $bs_b$, see FIG. 7(b). The visibility increases as the first surface reflection $fs_b$ in arm b overlaps the second surface reflection $bs_a$ in arm a, see FIG. 7(c). This overlap occurs at $p_t=n_{go}t$, where the reflections are coherent because of the compensation of optical path difference in sample 13 by the optical path length difference between the arms of the interferometer. Therefore, the difference in $p_t$, measured between a central maximum and a side peak in the interferogram envelope, corresponds to the optical thickness t of the sample, $n_{go}t$ (the same result is obtained for the opposite direction displacement of piezoelectric transducer 23, and a maximum of the interferogram envelope also occurs at $p_t=-n_{go}t$).

Thus, a priori knowledge of the group index together with the accurate measurement of $p_t$, allows for a determination of thickness t. A more rigorous mathematical derivation of the sample interferogram, including the effects of dispersion, is elaborated on in detail below.

The transducer displacement $p_t$ can be determined by accurate calibration of the displacement as a function of $V_p$, or by the method of fringe counting in the interferogram. Fringe counting is based on the fact that each period or fringe within the envelope of the interferogram corresponds to a displacement of $\Delta p_t=\lambda_o/2$. Therefore if sufficient visibility exists over the range of $p_t$ from 0 to $n_{go}t$, the number N of fringes between the central peak and one of the side peaks can be counted to determine t by $$n_{go}t = N\lambda_o/2 \text{ or } t = N\lambda_o/2n_{go} \tag{7}$$

For the example shown in FIG. 8, it was assumed that the source has a symmetric pure Gaussian spectral distribution of width $\delta\lambda=25$ nm, centered about $\lambda_o=0.83$ $\mu$m, and the sample thickness is $t=7.5$ $\mu$m. Counting the number of fringes between the central maximum and the secondary maximum yields $N=77$, which from the above relation gives $t=7.47$ $\mu$m, which is in good agreement with the assumed value. Note that a determination uncertainty regarding a location of the secondary maximum is no greater than one fringe, which corresponds to an uncertainty in t of 1/N or, in this case 1.3%.

Again, it is noted that it is required that the mean wavelength of the source distribution must be accurately known in order to calculate t. This can be accomplished by simultaneously measuring the source spectral distribution, via the unused coupler port interfaced to a spectrometer, during the recording of the sample interferogram.

A variation of this concept can have the control of the scanning piezoelectric voltage, the spectral distribution measurement, the recording of the interferogram, the determination of the envelope peaks, and the calculation of the sample thickness, by one skilled in the art using an automated computer control and data analysis system. Fringe counting is an accurate means by which the thickness of thin samples can be measured. For samples with a thickness which is large so that the optical path in the sample is many times greater than the coherence length of the source, the fringe visibility will be negligible in the region between the central and secondary maxima, and it is not possible to determine the occurrence of a fringe peak. In this case of large t values, variation must be relied upon, such as will be described in detail below. At this point, let it suffice to say that the accuracy need not be on the order of a fringe, since it is only the final etched sample thickness which must be known with high accuracy. One means to measure large values of t, is to mount one of the Michelson interferometer mirrors on a translation stage which is driven by a stepping motor. The stepping motor output can easily be controlled and monitored to provide path length measurement accuracies of 10 μm over a wide range of translation. During the initial stages of sample etching, while the thickness is about 1 mm, for example, a stepping motor may be used to traverse the Michelson mirror over the distances necessary to cause sets of wave packets $fs_a$ and $bs_a$ and $fs_b$ and $bs_b$ to overlap, and then in the final stages of etching, where the thickness is small (approximately 10 μm), the more accurate piezoelectric transducer and the fringe counting method would be used.

Figure 9:
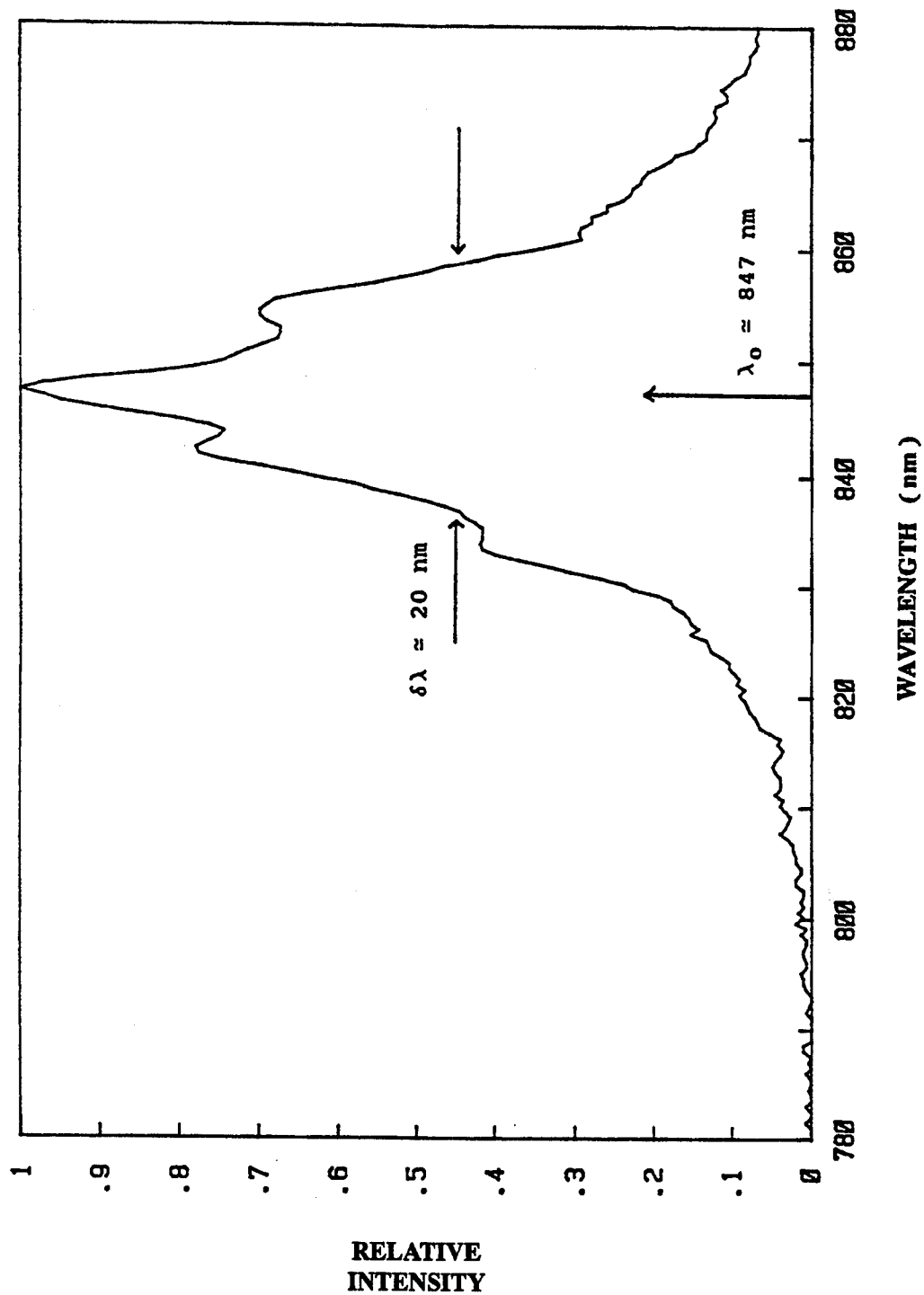
FIG. 9 is a spectral distribution for ELED used in the experiments at an operating current of 10 ma. Mean wavelength is 847 nm and spectral width is approximately 20 nm.

Interferograms were made for various thin silicon substrate samples with a nominal thickness of 8 μm. The ELED temperature and current were held constant at 25° C. and 10 ma. The source spectral distribution under these conditions is shown in FIG. 9, where it is seen that the mean wavelength is $\lambda_o = 0.847$ μm and the spectral width is approximately $\delta\lambda \approx 20$ nm or $\delta\sigma \approx 0.028$ $\mu m_{-1}$. There is also some periodic structure and asymmetry present, but these effects proved to be inconsequential as discussed in the following section.

The fiber coupler output beam 20 was focused onto a small, about 100 μm diameter region, at the center of sample 13. The center was found by displacing the sample along orthogonal axes in a plane normal to the beam, and locating the positions of the sample edges by monitoring the reflected beam intensity.

Figure 10:
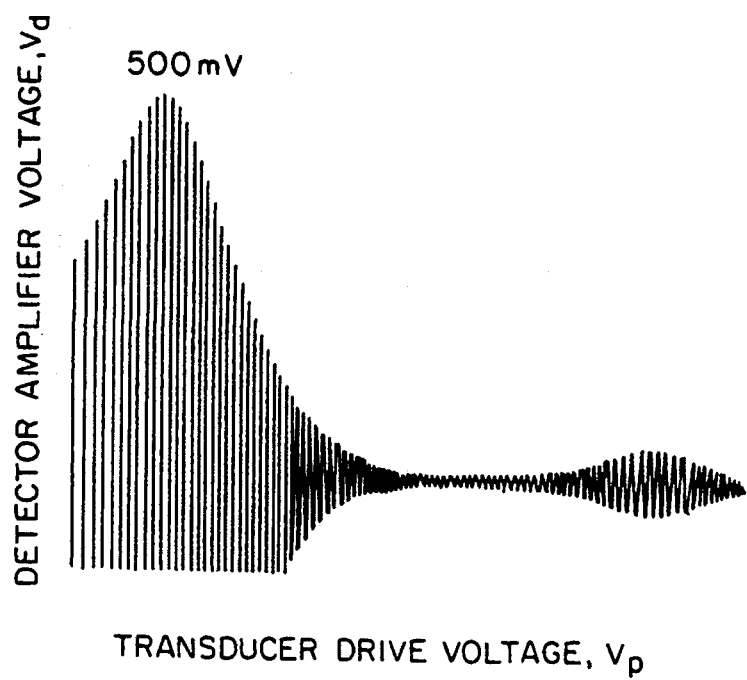
FIG. 10 is an actual sample interferogram obtained by photographing an oscilloscope recording of detector amplifier output voltage versus piezoelectric transducer ramp voltage. The number of fringes from central maximum to secondary maximum is N=79, corresponding to a sample thickness of $t = 7.8$ μm.

A typical interferogram picture of the oscilloscope trace of the detector amplifier voltage $V_d$ vs. the transducer drive voltage $V_p$, is shown in FIG. 10 [the number of fringes are counted visually giving N=79, corresponding to a sample center thickness of 7.8 μm as per equation (7)]. Numerous silicon substrate sample measurements are tabulated in Table I.

TABLE I

SAMPLE THICKNESS MEASUREMENT RESULTS

| Sample # | N | t (μm) |
|---|---|---|
| 1 | 87 | 8.6 |
| 2 | 78 | 7.7 |
| 3 | 86 | 8.5 |
| 4 | 77 | 7.6 |
| 5 | 84 | 8.3 |
| 6 | 80 | 7.9 |
| 7 | 76 | 7.5 |
| 8 | 81 | 8.0 |
| 9 | 77 | 7.6 |
| 10 | 79 | 7.8 |
| 11 | 84 | 8.3 |

An attempt was made to determine if there exists any variation of sample thickness as a function of position on the sample. Again, the edges of the 2 mm×2 mm sample were located, and a matrix of points, equally spaced at 500 μm intervals within this area, was probed by the coupler output beam. The results for one particular sample are shown in Table II, which shows that the maximum variation of thickness t over the sample is 0.3 μm.

TABLE II

SAMPLE THICKNESS VARIATION WITH POSITION

| | | x (μm) | | |
|---|---|---|---|---|
| | | −500 | 0 | +500 |
| Y (μm) | +500 | 7.7 | 7.9 | 7.7 |
| | 0 | 7.6 | 7.8 | 7.8 |
| | −500 | 7.7 | 7.6 | 7.6 |

The precision measurement of thin silicon samples uses the optical system having a fiber optic coupler probe $16_p$ that includes the fiber extending from coupler 15 and is associated with lens 16, an edge emitting LED for source 12, and a Michelson interferometer 11. The measurement precision is one optical fringe, or approximately 0.1 μm for silicon. Fiber optic probe $16a$ offers the capabilities for remote in-situ measurements and variable position localized thickness measurements. The flexibility of the fiber extending to coupler 15, and the small size and chemical inertness of the fiber/GRIN rod lens assembly 16 enable the probe end to be configured in a probe housing which could be placed in close proximity to sample 13 within the etching chamber while it is being processed. In this way, continuous sample thickness measurements could be made, and the data used to control the etching parameters.

The basic operation of the equipment and measurement methods have been successfully demonstrated, and several modifications can be made. As mentioned previously, the spectral distribution of the source determines several basic features of the sample interferogram. The source width (and hence the coherence length) must be such that the fringe visibility goes through a distinct minimum, while maintaining adequate visibility for fringe counting, as the Michelson interferometer is scanned to generate the interferogram. For samples with thickness values on the order of 5 to 10 μm, this means that the source must be either a edge-emitting LED (ELED) or a superluminescent diode (SLD). The SLD offers potentially higher optical powers than the ELED, which can be important in certain applications, such as in-situ measurements, where the reflected sample beam optical power might be small.

Figure 11:
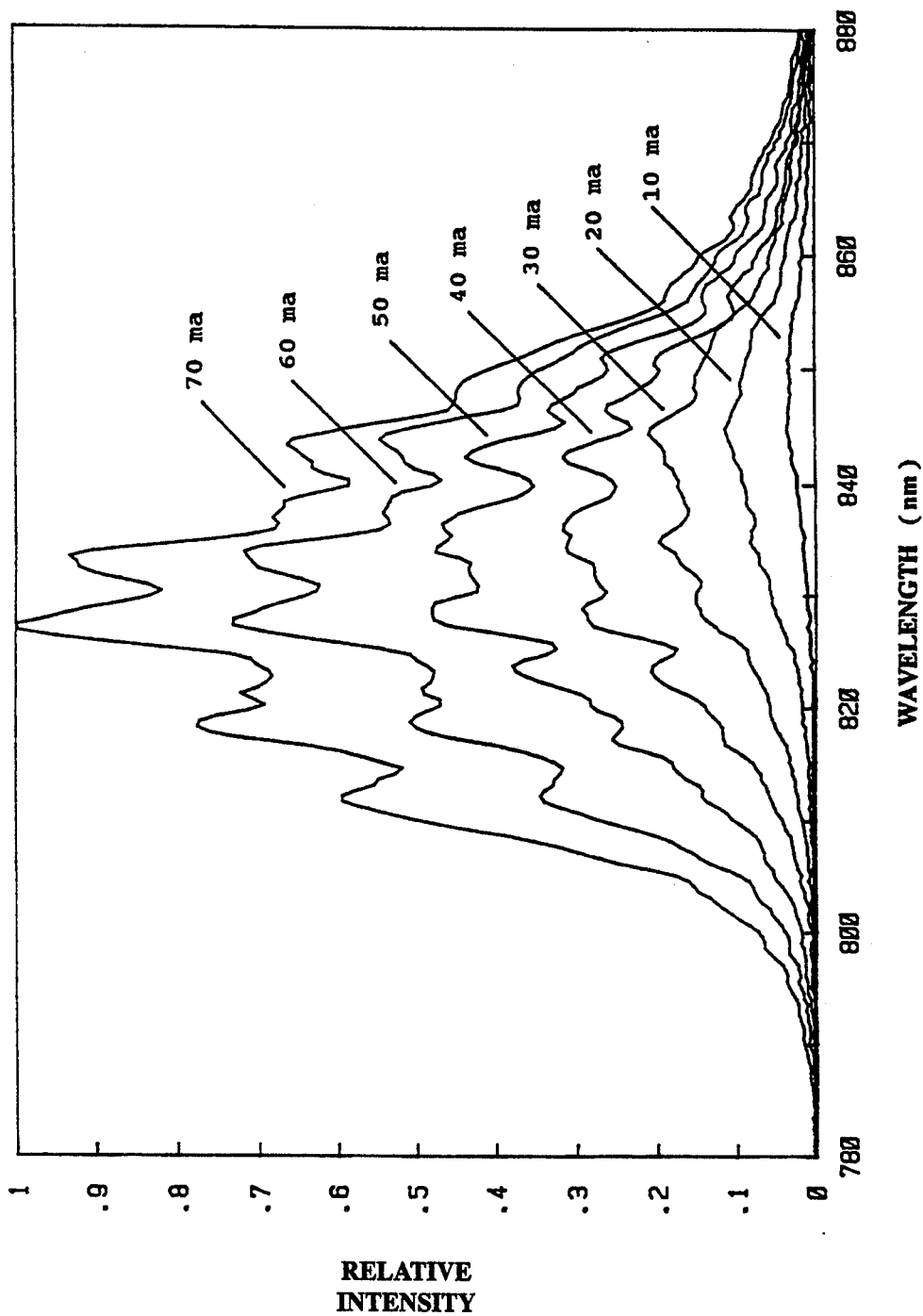
FIG. 11 depicts ELED source spectra at 25° C. for various operating currents. Presence of structure and asymmetry increase as current increases, while mean wavelength shifts to smaller values.

Either type of source can exhibit both spectral structure and asymmetry. It is important that the structure be minimized in order that the source interferogram components do not interfere with the sample interferogram secondary maximum. The ELED source 12 spectral properties were carefully measured at a constant temperature of 25° C. for various drive currents and are shown in FIG. 11. Note that there is significant source structure and asymmetry for the higher operating currents, and that the mean wavelength shifts to higher values as the current is decreased. To minimize the effects of source spectrum periodic structure and asymmetry discussed in the previous sections, ELED source 12 was operated at a current of 10 ma. It was noted further that even at this low operating current, there was adequate light energy to provide a large signal-to-noise ratio for the system detector output.

FIG. 9 is an expanded plot of the spectral distribution for an operating current of 10 ma. It can be seen that even at this low operating current some structure is present with a period of $\Delta\lambda = 5.4$ nm ($\Delta\sigma = 0.075$ $\mu m^{-1}$).

Figure 12:
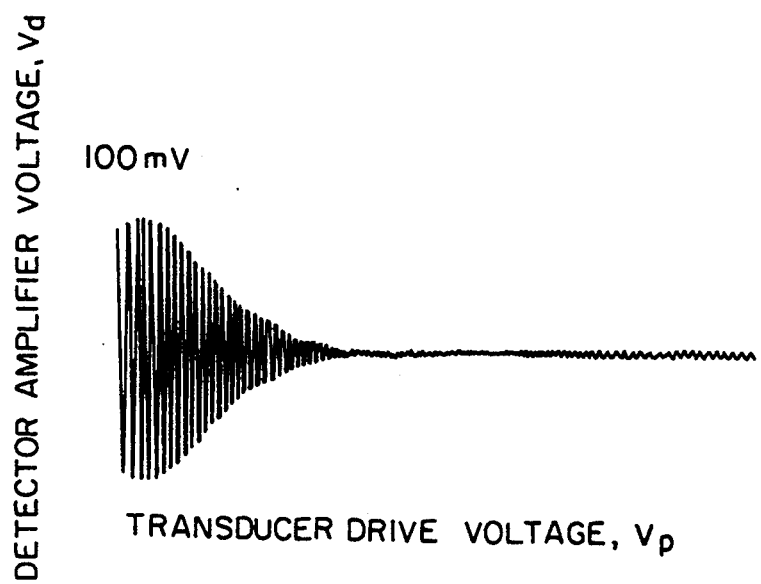
FIG. 12 is a source interferogram for ELED operating at 10 ma current. Lack of significant interferogram amplitude other than central envelope indicates minimal periodic structure.

The effect of this structure is minimal in the measurement of thin silicon films. First, the period is such that a contribution to the source interferogram would be made at a path difference of $\Delta p = 1/\Delta \sigma = 133$ μm, which is much greater than the sample round trip optical path length of $2n_g o t \approx 60$ μm. Second, the amplitude of the periodic structure is much less than the Gaussian component amplitude and therefore its contribution to the interferogram will be correspondingly small. These conclusions are confirmed by the 10 ma source interferogram shown in FIG. 12 for a range of $\Delta p$ from $-10$ μm to 110 μm. The mean wavelength of the source must also be considered in the selection of an appropriate optical source. The source wavelength depends on the material composition of the source Both GaAlAs and InGaAsP ELED's, operating in the spectral regions near 0.83 μm and 1.3 μm, respectfully, are commercially available.

Each fringe in the interferogram corresponds to an optical path difference of $\lambda_o/2$ and therefore the shorter the wavelength, the greater the precision in the measurement of the sample thickness. In this respect, the GaAlAs source with $\lambda_o \approx 0.83$ μm would be better than an InGaAsP source. On the other hand, the absorption of light is greater in silicon for shorter wavelengths, and therefore for relatively thick samples, the back surface reflected beam would be too strongly attenuated to contribute to the interferogram.

The value of the interferogram secondary maximum, relative to the maximum at 0 path length difference, is related to the ratio of the fields resulting from the back and front surface reflections. A ratio of 10% is, somewhat arbitrarily, chosen as the minimum value which will result in a clearly discernable secondary maximum for fringe counting.

The back surface field is reduced with respect to the first surface field by three factors in addition to the sample absorption. First, the coupling of the reflected beams back into the fiber will be different due to the unequal distances from the principal plane of the GRIN rod lens. In practice, the relative position of the lens and the sample is adjusted so that the height of the secondary maximum is maximized for a given film thickness t. Second, the back surface reflection is transmitted twice through the sample/air first surface, and therefore the back surface field amplitude is reduced by an interface transmittance factor $t^2$ relative to the front surface field, [here t represents the electric field transmission coefficient, which for silicon in air is $t = 0.82$ μm, giving $t^2 \approx 0.68$, (this value for $n_g o t$ can be calculated using the phase index values for various wavelengths found in Edward D. Palik's *Handbook of Optical Constants of Solids*, Academic Press, 1985, pp. 547–569)]. Third, while the front surface interface is with air, the back surface has on it the substrate circuitry, which consists of thin layers of polymers, metals, and oxides. These materials are not necessarily uniform, nor highly reflecting, with the result that the back surface reflection is less than the front surface silicon/air reflection. The reduction of the back surface reflection due to these factors, and the absorption by the material itself, determine the source wavelength limitations on the sample thickness which can be measured.

If it is assumed that the coupling efficiency back into the fiber is equal for the front and back surface sample reflected beams or wave packets fs and bs, that the reflection coefficients are equal for the two surfaces, and taking into account the reduction in the back surface field by the interface transmittance factor $t^2$, then a limit on the maximum thickness t of the sample can be determined due to absorption. The ratio of the interferogram envelope secondary and primary maxima is $$E_{fs}E_{bs}/(E^2_{fs}+E^2_{bs}) \quad (8)$$

where $E_{bs}/E_{fs} = t^2 \exp(-\alpha t)$ (9)

and $\alpha \approx$ is the absorption coefficient of silicon. For $\lambda = 0.83$ μm, $\alpha \approx 7 \times 10^{-1}$, while for $\lambda = 1.3$ μm silicon is transparent ($\alpha \to 0$), (see S. M. Sze's pi Physics of Semiconductor Devices, Wiley-Interscience, New York, 1969, p. 661). Equations (8) and (9) can be used to calculate the maximum sample thickness which would yield a secondary interferogram envelope maximum equal to 10% of the primary maximum. The result is $t_{max} \approx 27$ μm.

Note that in FIG. 10, the ratio of the interferogram maxima for a 7.6 μm sample is approximately 10%. This is an indication that the assumptions regarding beam to fiber coupling efficiencies and equal interface reflection coefficients are not necessarily valid. Therefore, in practice, for a sample thickness greater than 10 μm the ratio will always be less than 10% at 0.83 μm due to increased absorption, and therefore the longer wavelength InGaAsP source would be more suitable.

In the following a more detailed derivation of the sample interferogram is presented. Again, interferometer 11 is a symmetric Michelson interferometer with a two beam (wave packet) input from sample 13, but now the effects of material dispersion are included. As in the previous treatment of the source interferogram, it is assumed that the inputs to the interferometer have the same polarization, that they can be treated as emanating from point sources, and that the beams have no angular misalignment. The use of the fiber coupler input assures that all of these assumptions are valid.

It will be shown that for a typical sample thickness of the order of 10 μm, the effects of material dispersion can be neglected, and that the previous results regarding the features of the sample interferogram, which were based on the qualitative wave-packet overlap treatment, are completely valid.

Referring once again to FIG. 6, the continuous optical output field 12' from source 12, represented by $E_s(\sigma)$, is incident on sample 13 via the bi-directional coupler 15. This beam is partially reflected from the front and back surfaces as wave packets fs and bs with a relative phase difference between the reflected fields of $4\pi\sigma nt$, corresponding to the optical path length in the material. Here n is the phase index of the material evaluated at the particular wavenumber $\sigma$. Due to the partial transmittance of the optical field at the sample material boundaries, the amplitude of the back surface reflected beam relative to the front surface reflection is $t^2$, where t is the interface transmittance factor of the sample/air interface. The front and back surface reflected beams are coupled into the Michelson interferometer via GRIN rod lens 16 and the fiber coupler 15. The differential optical path length between the two arms of interferometer 11 is $2p_t$, and is varied by means of the piezoelectric transducer 23 and mirror 24.

Using the complex field notation, and omitting the explicit time dependence of the fields, the output field from the interferometer is expressed as $$E(\sigma) = Re\{U(\sigma)\} \quad (10)$$

where $U\{\sigma\}$ is the complex field amplitude as a function of $\sigma$, $$U(\sigma) = E_s(\sigma)[1 + \exp(i4\pi\sigma p_t)][1 + t^2\exp(i4\pi\sigma nt)] \quad (11)$$
$$= E_s(\sigma)[1 + t^2\exp(i4\pi\sigma nt) + \exp(i4\pi\sigma p_t) +$$
$$t^2\exp(i4\pi\sigma(p_t + nt)] \equiv U_1 + U_t + U_p + U_2$$

(Note that $U_1 = E_s(\sigma)$ and that common phase and amplitude factors have been omitted.)

In this expression, n is, in general, a function of $\sigma$. Also it has been assumed that the mirror reflectances are both equal to 1, and that the beamsplitter is lossless. The time averaged intensity for a wavenumber component $\sigma$ is then expressed as $$I(\sigma) = |U(\sigma)|^2 = UU^* \quad (12)$$
$$= |U_1|^2 + |U_t|^2 + |U_p|^2 + |U_2|^2 + (U_1U_t^* +$$
$$U_1^*U_t) + (U_pU_2^* + U_p^*U_2) + (U_1U_p^* + U_1^*U_p) +$$
$$(U_tU_2^* + U_t^*U_2) + (U_1U_2^* + U_1^*U_2) + (U_tU_p^* +$$
$$U_t^*U_p)$$

In the above equation the terms have been grouped according to the constant terms on the first line, which are not a function of $p_t$, and the remainder of the terms, which are variable. This expression can be further simplified by using the relation $(Z+Z^*)=2\text{Re}\{Z\}$, where Z is any complex number, and by noting that $$|U_1|^2 = |U_p|^2 = |E_s(\sigma)|^2$$
$$|U_t|^2 = |U_2|^2 = t^2|E_s(\sigma)|^2$$
$$(U_pU_s^* + U_p^*U_2) = U_1U_t^* + U_1^*U_t$$
and $(U_tU_2^* + U_t^*U_2) = t^2(U_1U_p^* + U_1^*U_p)$ Using these relations, $$I(\sigma) = 2[(1+t^2)|E_s(\sigma)|^2 + 2\text{Re}\{(U_1U_t\} + (1+t^2)\text{Re}\{U_1U_p\} + \text{Re}\{U_1U_2\} + \text{Re}\{U_tU_p^*\}] \quad (13)$$

The first three terms are constants with respect to $p_t$, and contribute to the constant intensity present in the output. The last three terms contain the information related to the sample thickness t.

The total intensity $I(p_t)$ of the output beam is obtained by integrating the function $I(\sigma)$ over the entire spectral range of the source, $$I(p_t) = \int I(\sigma)d\sigma$$

Denoting the integral of the three constant terms in the expression for $I(\nu)$ as $I(\infty)$, the expression for $I(p_t)$ becomes $$I(p_t) = I(\infty) + 2\text{Re}\{(1 + t^2)\int U_1U_p d\sigma + \int U_1U_2 d\sigma + \quad (15)$$
$$\int U_tU_p^* d\sigma\}\Big|_{-\infty}^{+\infty}$$

Because of the limited spectral range of the source, the limits of integration have been chosen to be $\pm\infty$ for mathematical convenience. The notation for $I(\infty)$ follows by recognizing that as $p_t \to \infty$, the three non-constant terms $\to 0$, and therefore, the first three terms simply represent the value of $I(p_t)$ at $p_t = \infty$. At this point, a specific functional form for the source energy spectral distribution, $|E_s(\sigma)|^2$, is chosen which represents typical high radiance limited spectral width sources, such as light emitting diodes (LED's) and superluminescent diodes (SLD's). These sources can be represented by a normalized Gaussian spectral distribution of the form $$|E_s(\sigma)|^2 = (1/\delta\sigma)\exp\{-\pi(\sigma-\sigma_o)^2/(\delta\sigma)^2\} \quad (16)$$

In order to evaluate the integral in equation (15), a change of variables is made so that the integrals are symmetric about $\sigma_o$. Letting $s=\sigma-\sigma_o$, and setting the limits of integration on s to be $\pm\infty$ (this is valid since $\sigma_o >> \delta\sigma$), each of the three integrals in equation (15) can be put in a standard form which can be found in integral tables, see M. Abramowitz et al's. *Handbook of Mathematical Functions*, Dover Publications Inc., New York, 1965, p. 303 which gives the general relation $$\int_{-\infty}^{+\infty} \exp\{-[as^2 + 2bs + c]ds = (\pi/a)^{\frac{1}{2}}\exp\{(b^2 - ac)/a\} \quad (17)$$

Here a and b are the appropriate constants for each integral. Using equations (15), (16), and (17), the total intensity is then $$I(p_t) = I(\infty) + 2\text{Re}\{(1 + t^2)\exp[i4\pi\sigma_o p_t]\exp[-\pi(p_t)^2(2\delta\sigma)^2] + \quad (18)$$
$$= 2t^2\exp\{i4\pi\sigma_o(p_t + n_ot)\exp\{-\pi(p_t + n_{go}t)^2(2\delta\sigma)^2/[1 - in_o't(2\delta\sigma)^2]\}[1 - in_o't(2\delta\sigma)^2]^{\frac{1}{2}} + 2t^2\exp\{-i4\pi\sigma_o(p_t - n_ot)\exp\{-\pi(p_t - n_{go}t)^2(2\delta\sigma)^2/[1 - in_o't(2\delta\sigma)^2]\}\}[1 - in_o't(2\delta\sigma)^2]^{\frac{1}{2}}$$

To obtain this result, it has been assumed that the phase index of refraction, which is a function of the wavenumber, can be expanded in a Taylor series near $\sigma_o$, $$n = n(\sigma) = n(\sigma_o) + (\sigma - \sigma_o)(dn/d\sigma)|_{\sigma_o} \equiv n_o + (\sigma - \sigma_o)n_o'$$

Also, the notation $n_{go}$ has been used for the value of the group index at $\sigma = \sigma_o$ $$n_{go} = n_g(\sigma|_{\sigma_o} = [n(\sigma) + \sigma(dn/d\sigma)]|_{\sigma_o}$$

Using equation (18), the features of the interferogram, which were derived previously using the wave-packet overlap analysis, are confirmed. First, the interferogram function is an oscillatory function with an envelope that consists of three Gaussian functions centered at $p_t = 0$ and $\pm n_{go}t$. Also, the shape of the envelope function, and the phase of the oscillation, depend on the source mean wavenumber and spectral width, the sample thickness, and the phase and group refractive indices of the sample.

To this point, the derivation of the interferogram function is valid for a dispersive sample medium of any thickness. The contribution of dispersion appears whenever the factor $n_o'$ is present, and the magnitude of the effect increases with increasing sample thickness. It can be seen that dispersion affects both the phase and amplitude of the interferogram function. The amplitude reduction of the secondary maxima is not significant as long as there is sufficient signal to allow for peak height determination for fringe counting. The phase is affected by both the addition of constant phase terms, and by a chirping, or nonlinear variation of phase with $p_t$.

In order to assess the effect of dispersion, it is helpful to consider the magnitude of these factors for a particular experimental situation corresponding to a practical sample measurement. The source used in these experiments was chosen to be an ELED with a mean wavelength of approximately 0.85 μm and a spectral width of approximately 20 nm (see FIG. 9). These values correspond to values of $\sigma_o=1.18$ μm$-1$ and $\delta\sigma=0.028$ μm$^{-1}$. The sample is a silicon substrate with a thickness t on the order of 10 μm. The values of the group index and the derivative of the phase index at $\sigma_o$ can be derived from published data in Edward D. Palik's *Handbook of Optical Constants of Solids*, cited above, and are found to be $n_{go}=4.28$ and $n_o'=0.5$ μm. For these values of $\sigma_o$, $\delta\sigma$, t and $n_o'$ it is found that the contributions to the interferogram due to material dispersion can be neglected. For example, the constant phase factor is $$\phi = \tan^{-1}(2n_o' t(\delta\sigma)^2) = \tan^{-1}(0.008) = 0.008 \text{ rad}$$

Similar negligible values are obtained for the amplitude reduction factor and the chirp phase term.

It should be noted that these negligible values are for small values of t, and that for larger values, these effects should be included. For example, if the maximum tolerable phase offset due to material dispersion is chosen to be a 10% for either the second or third terms in the interferogram, then the corresponding maximum sample thickness t is $\simeq 50$ μm.

If the sample thickness is small enough that the material dispersion effects can be ignored, then the interferogram function can be simplified to give $$I(p_t) = I(\infty) + \cos\{4\pi\sigma_o p_t\}\exp[-\pi(p_t)^2(\delta\sigma)^2] + \\ \cos\{4\pi\sigma_o(p_t + n_o t)\}\exp[-\pi(p_t + n_{go}t)^2(2\delta\sigma)^2] + \\ \cos\{4\pi\sigma_o(p_t - n_o t)\}\exp[-\pi(p_t - n_{go}t)^2(2\delta\sigma)^2] \quad (19)$$

Equation (19) is the mathematical representation of the result which was derived qualitatively using the wavepacket approach, and which is represented by the interferogram shown in FIG. 8.

In addition to the capability for determining a measurement of thickness of a sample, the optical system has the capability for determining certain optical properties of optical waveguides which include the attenuation of passive waveguides, the change in the absorption of active waveguides within a bias voltage, the value of the effective index of refraction of the waveguide and the change of effective index with an applied bias voltage or an external perturbing disturbance.

Optical system 10', depicted in FIG. 13, is a configuration which provides for the characterization of a semiconductor optical waveguide An optical source 12', which could be a multi-mode laser diode, acts as a limited coherence source for optical wave packets 20' (having a field amplitude $E_s$). Laser current and thermal stabilization circuitry are included in association with optical source 12' to assure appropriate operating parameters for energy that is coupled to a port 15a' of a 3 dB single-mode fiber bi-directional coupler 15'.

A waveguide sample 13' to be characterized by the optical system is optically coupled to a port 15b' of bi-directional coupler 15' and receives about 50% of incident optical wave packets 20' as wave packets 50. A coupling lens 16' is optically coupled to a port 15c' of the bi-directional coupler to receive about 50% of incident optical wave packets 20' as incident optical wave packets 40 that are directed to retroreflector 21'. The retroreflector is mounted on a piezoelectric translator 23' functioning to bidirectionally displace the retroreflector in the arrow directions in response to an appropriate ramp voltage $V_p$. Incident optical wave packets 40 are reflected to a fixed reference mirror 22' which reflects the incident optical wave packets as reflected optical wave packets 40a ($E_r$) from retroflector 21' through coupling lens 16' through bi-directional coupler 15' and to a photodetector 25' via a port 15d' of the bi-directional coupler. The photocurrent received from photodetector 26' is fed through a photocurrent transimpedance amplifier 27' and to an oscilloscope/computer 28'. A ramp voltage generator 29' generates the appropriate voltage $V_p$ for appropriately displacing piezoelectric translator 23'.

Measurements of the sample parameters of interest are derived from the information contained in the output voltage from amplifier 27', also known as an interferogram. This output is produced by a Michelson interferometer 11' made up of the optical pathways through at least some of the elements 12' through 26'.

As mentioned above, optical wave packets 20' from optical source 12' is coupled into single-mode fiber 3 dB bi-directional coupler 15' which splits the beam into two equal power beams 40 and 50. The coupler output passing through port 15c' is collimated by lens 16' which launches collimated beam 40 into retroflector 21'. The retroflector is mounted on a precision translation stage (piezoelectric translator 23') which is capable of displacing retroreflector 21' along a direction collinear with the collimated beam in proportion to a voltage $V_p$ applied to the piezoelectric translator from ramp generator 29'. Fixed mirror 22' is used to reflect a collimated beam 40a back through retroflector 21' lens 16', port 15c' and into fiber coupler 15'. This reflected collimated beam 40a serves as the reference beam in interferometer 11'.

Energy 50 from 3 dB bi-directional coupler 15' is fed to sample 13' whose properties are to be measured. Due to the partial transmittance and reflection which occur at the end surfaces of sample 13' a series of reflected sample beams 50a, 50b and 50c will be produced, which are coupled back into fiber coupler 15' via port 15b'.

The characteristics of the waveguide sample are determined by consideration of the first three reflected sample beams, 50a, 50b and 50c. Sample beam 50a results from the partial reflection of the incident beam 50 from the front surface 13a' of waveguide 13'. The second sample beam 50b results from that portion of the incident beam 50 which has been coupled into waveguide 13' transmitted the length l of the waveguide, reflected from the back surface 13b' and transmitted back along the length of the waveguide and then coupled out of the waveguide at its front surface. That is to say, sample beam 50b has made one complete round-trip traversal of the length of waveguide 13'. The third sample beam 50c is from that portion of the incident beam 50 which has made two complete round-trip traversals of waveguide 13'. This sample beam 50c has been coupled into waveguide 13' transmitted the length l of the waveguide, reflected at the back surface 13b' transmitted back through waveguide 13' reflected at the front surface 13a' transmitted again along the length l of waveguide 13', reflected again from the back surface 13b', transmitted the length 1 of waveguide 13' and coupled out of the waveguide at the front surface. That is to say, sample beam 50 has made two complete round trips, see FIG. 4.

Each of these three sample beams 50a, 50b and 50c are coupled back into the fiber coupler 15' via port 15b'. These recombined beams exit, fiber coupler 15' at port 15d' and are incident upon photodetector 26'. The arrival of each of these sample beams at the photodetector is delayed with respect to one another as a result of the different optical paths traveled by each beam. If the time delay between the sample beams reflected from the sample is greater than the coherence time of source 12', there will be no interference between these beams; that is, the total intensity incident on detector 26' is just the sum of the intensities of the individual sample beams 50a, 50b and 50c.

However, these sample beams 50a, 50b and 50c can be made to interfere individually with reflected reference beam 40a if the optical path of the reference beam 40a is made nearly equal to the individual optical paths of the sample beams. This is accomplished by imparting translational motion to displace retroflector 21' via piezoelectric transducer 23' as a result of applying an appropriate ramp voltage, $V_p$, to the piezoelectric translator.

The photodetector generates a current which is proportional to the integrated intensity over its active area. The photocurrent is the input to the transimpedence amplifier which produces a voltage $V_a$. The recording of $V_a$ as a function of $V_p$ is the interferogram which contains the information related to the waveguide parameters to be measured. This is understood by considering the relationships between the source and waveguide parameters and the intensity of the output beam of the interferometer.

Figure 14:
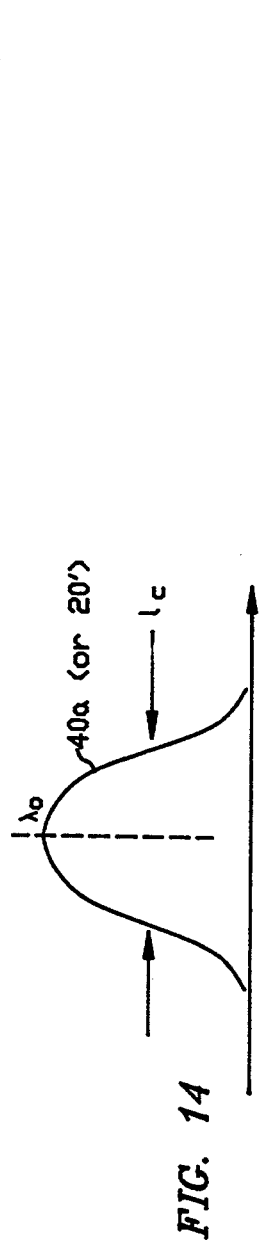
FIG. 14 is a representation showing coherence length $l_c$ related to the width of the spectral energy wavelength distribution $\delta\lambda$ by the relation $l_c = \lambda_o^2/\delta\lambda$.

The characteristics of optical source 12' are critical to the implementation of this invention. The source is chosen so that its central emission wavelength $\lambda_o$ is equal to the wavelength at which the waveguide modulators are to be operated (typically this is in the range from 1.5 to 1.55 μm). Also the source is chosen to be one with a limited coherence length $l_c$ (or equivalently, a limited coherence time). The coherence length is related to the width of the spectral energy wavelength distribution $\delta\lambda$ by the relation $l_c = \lambda_o^2/\delta\lambda$, see FIG. 14. The significance of this choice is that if an optical wave packet or, a wavetrain, 20' is emitted from the source, divided into two waves 40 and 50 that travel over two paths of different length, and the two waves are recombined, there will be no interference produced if the path difference between the beams is greater than $l_c$. Actually, this is only a general relationship; a more accurate statement, as stated above, is that maximum coherence occurs for a path difference of 0, and the coherence diminishes continuously as the path difference increases. There will always be some degree of partial coherence for differences greater than 0, but $l_c$ is conveniently taken as the maximum path difference for which 13 coherence exists.

This property of source 12' is important in that the reflected waves, sample beams 50a, 50b and 50c, from sample 13' travel different path lengths. The path length differences between the first and second waves, sample beams 50a, and 50b and between the second and third waves, sample beams 50b and 50c, is just the round trip optical path length in the waveguide, 2nl. Here n is the effective group refractive index for the fundamental mode of the waveguide sample.

Therefore, if source 12' is chosen so that $l_c$ is less than 2nl, there will be no interference between the sample reflected waves. Interference can occur between each of the sample waves sample beams 50a, 50b and 50c, and reference wave 40a when the optical path length of the reference arm of the interferometer equals the optical path lengths of the sample beams.

Figure 15A:
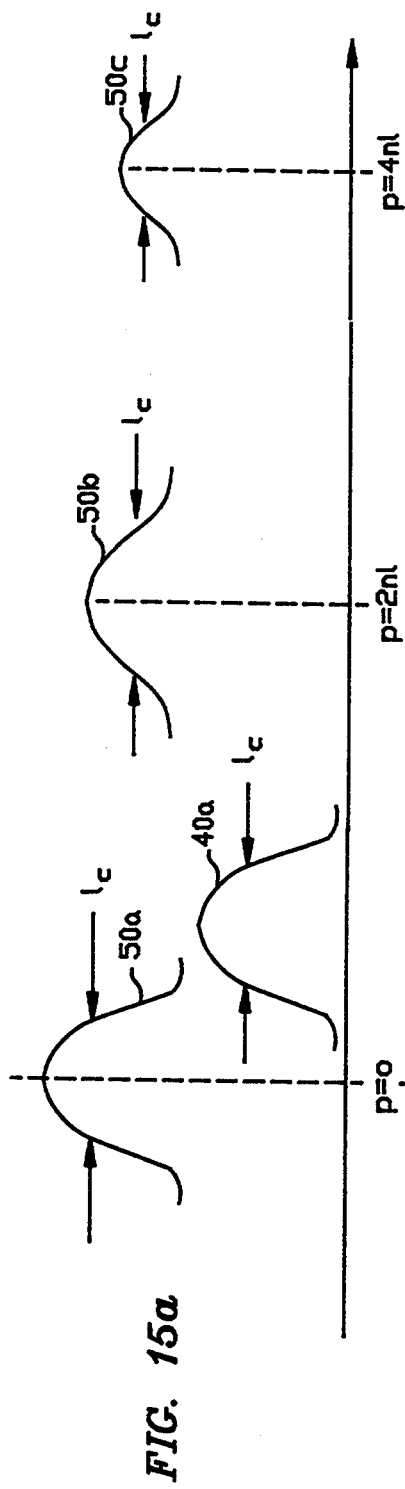
FIGS. 15a and 15b show sample and reference beams as wavepackets with coherence lengths $l_c$ (resulting interferogram intensity for $l_c$ approximately equals 2 nl).
Figure 15B:
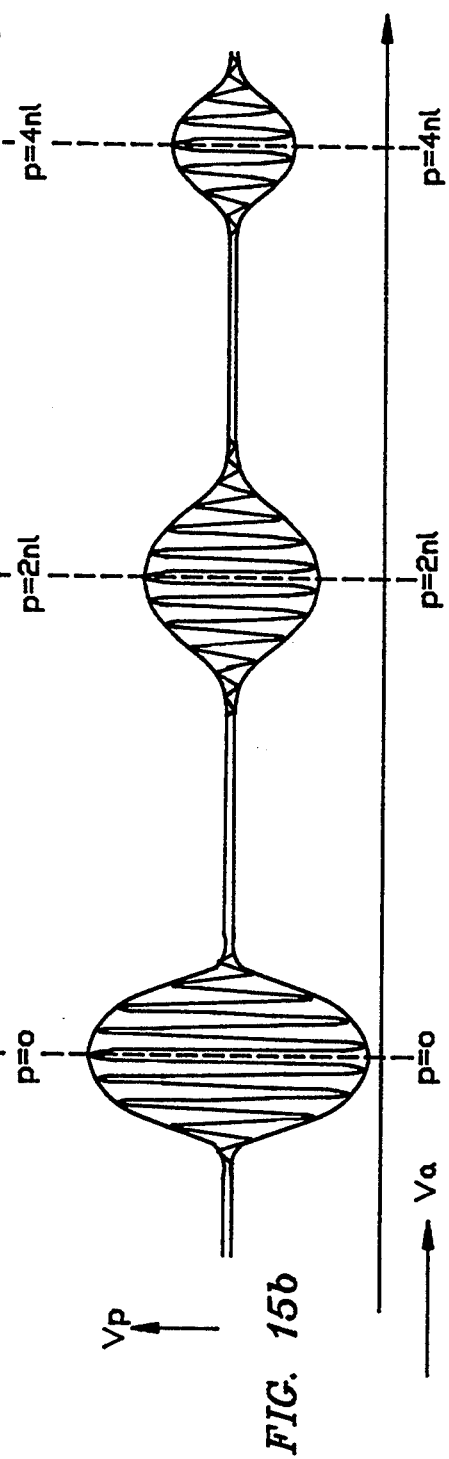

The possible cases of interference as related to the position of the reference arm retroreflector are illustrated in FIG. 15a, where the wavetrains, sample beams 50a, 50b and 50c, and reference wave 40a are represented as packets of width $l_c$. Here p is the change in length of the reference arm as a result of the response of the piezoelectric translator to the ramp voltage $V_p$. It is assumed that p is linearly proportional to $V_p$, and that the reference path has been chosen so that p=0 when the reference wave optical path is equal to the optical path of the front surface sample reflection wave. Note that maxima in the interferogram of FIG. 15b occurs when p=0, 2nl, and 4nl, and that if $l_c$ is approximately equal to 2nl, there will be some partial coherence for values of p between the maxima, that is, interference fringes with reduced amplitudes will be apparent.

As an example of the choice of optical source 12', consider the measurement of a semiconductor optical waveguide device made from InP based materials, having a length of 150 μm, an approximate value of the effective index of 3.3, and operating at a wavelength of 1.5 μm. The central wavelength of the source is required to match the operational wavelength of the modulator, 1.5 μm. The coherence length required is $l_c = 2nl \simeq 1,000$ μm = 1 mm Therefore, the source must have a spectral width of $\delta\lambda = \lambda_o^2/l_c \simeq 22$ nm. An optical source with these properties is readily available in the form of a multimode InP/InGaAsP laser diode, which is available commercially from many suppliers. For devices with longer waveguide lengths, laser diodes or erbium doped fiber lasers which have smaller spectral widths can be selected.

To understand the relationship between the interferogram and the waveguide parameters, consider the amplitudes of the three sample waves, sample beams 50a, 50b and 50c, and the reference wave 40a, and how they interfere in the cases described above. Let the amplitude of the wavetrain emitted from the source be $E_s$, the reflectance and transmittance of the sample surfaces $r_s$ and $t_s$, and the attenuation per unit length of the waveguide $\alpha$. Then the field amplitudes incident on the photodetector are given by $E_r = \frac{1}{2}E_s$ $E_o = \frac{1}{2}E_s R_s$ $E_1 = \frac{1}{2}E_s t_c t_s^2 r_2 \exp(-\alpha l)$ $E_2 = \frac{1}{2}E_s t_c t_s^2 r_s^3 \exp(-2\alpha l)$ Here $t_c$ represents the fraction of the electric field coupled into and out of the waveguide. This factor is not known a priori, in that it depends on the particular arrangement and conditions of the optical configuration. The values of $r_s$ and t can be obtained from independent measurement of the refractive index of the waveguide bulk material.

The values of the interferogram maxima, $I_o$, $I_1$, and $I_2$, at p=0, 2nl, and 4nl are obtained from these values for the fields. Remembering that coherence exists only between the reference wave and one of the sample reflected waves for each value of p, the following are obtained $$I_0 = [E_r + E_o]^2 + [E_1]^2 + [E_2]^2 = I_b + 2E_r E_o$$

$$I_1 = [E_r + E_1]^2 + [E_o]^2 + [E_2]^2 = I_b + 2E_r E_1$$

$$I_2 = [E_r + E_2]^2 + [E_o]^2 + [E_1]^2 = I_b + 2E_r E_2$$

where $I_b = E_r^2 + E_o^2 + E_z^2 + E_2^2$ is the background intensity level, that is the intensity present at the detector when p >> nl, i.e. p approaches ∞.

The interferogram is the recording of the of the amplifier output voltage $V_a$, which is proportional to the integrated intensity over the active area of the detector. Therefore, the interferogram will be characterized by a background voltage and voltage maxima which are proportional to the above values of the intensity. The waveguide parameters to be determined are derived from the interferogram voltage levels as follows.

A. Attenuation

From the above equations, $$(V_2 - V_b)/(V_1 - V_b) = (I_2 - I_b)/(I_1 - I_b) = E_2/E_1$$

and $$E_2/E_1 = r_s^2 \exp(-\alpha l)$$

It can be seen that the unknown parameter $t_c$ has been eliminated. Also the values $r_s$ and 1 can be measured independently. Therefore the only remaining unknown parameter, $\alpha$, is obtained from the measured interferogram voltages by means of the equation, $$\alpha = (1/l) \ln[r^2(V_1 - V_b)/(V_2 - V_b)]$$

This parameter is important for all semiconductor waveguide devices, both active and passive ones. It can be used to measure the intrinsic waveguide attenuation, and in the case of modulator devices, the change in absorption with respect to an applied modulation voltage or external disturbance.

B. Effective Refractive Index and Change in Effective Refractive Index

As mentioned previously, it is possible to choose an optical source with a spectral bandwidth such that the coherence length of the source is less than the optical path difference, 2nl, between successive sample beams, and yet large enough so that some degree of partial coherence exists between the individual sample beams and the reference beam for path differences up to nl. Under these conditions, the interferogram maxima will be clearly discernable, as will the interference fringes in the interferogram envelope, see FIG. 15. Each fringe represents a change in path difference, p, equal to $\lambda_o/2$. The value of $\lambda_o$ can be determined from independent measurements of the source, and therefore the total path difference corresponding to the successive interferogram maxima can be measured directly from the interferogram by counting the number of fringes N between the maxima. This measured path difference is just the round trip path length in the waveguide, 2nl. Again, since the length 1 of the waveguide can be measured independently, the effective refractive index can be determined from the relation $$n = N(\lambda_o/4l)$$

Furthermore, if a field is applied to a waveguide modulator 60, the refractive index will change to a new value n' characterized by a new value of N, N'. Since 1 and $\lambda_o$ remain constant, the change in index due to an applied modulation field is then given by $$\Delta n = n' - n = (N' - N)(\lambda_o/4l)$$

C. Changes in Index and Attenuation Due to External Perturbations

The above methods can also be used to measure changes in waveguide parameters with respect to external disturbances 70 such as temperature changes or irradiation by optical beams. The recorded results can be monitored successively and compared.

Another method to determine the optical path length, and changes in the optical path length, is to count fringes derived from an external Michelson interferometer using a highly coherent source. Here the movable mirror in the external interferometer is mounted to the translation stage in the partial coherence interferometer. The positions of the interferogram maxima are detected using a peak detector circuit, and the number of fringes measured between the peak detections yields the optical path length.

The waveguide measurement methods described here are applicable in principle to any type of optical waveguide, both passive and active devices, but are particularly useful for short length devices and active devices, such as semiconductor waveguide optical loss and phase modulators.

The parameters of an optical waveguide devices, including absolute attenuation and effective refractive index, and the changes in these parameters with the application of an external disturbance 70, can be measured using the recorded interferogram of a Michelson interferometer containing the sample and an appropriately chosen optical source. The attenuation measurements are made by comparing the values of the maxima of the interferogram at the values of the reference arm path length changes corresponding to the optical path length of the sample and to two times the optical path length of the sample. The effective refractive index is determined by counting the number of fringes in the recorded interferogram between successive maxima. Changes in these parameters due to an external disturbance 70, such as temperature variations, are measured by simply comparing the interferograms before and after the external disturbance is applied. The measurements of the all the waveguide parameters are made without removing the sample from the measurement system. Furthermore, since refractive index changes and absorption changes occur simultaneously to some extent in these devices, this method provides a means for measuring the degree of coupling or interaction between these parameters.

A more accurate determination of the waveguide attenuation coefficient is made due to the fact that there is no uncertainty in the amount of optical power coupled into the waveguide due to the removal of the coupling parameter $t_c$.

The value of the effective index of the waveguide is measured using this method and the change in the waveguide absorption and index are readily measured. The same optical system configuration is used to measure these parameters and the interaction between device parameters can be measured. The measurements are nondestructive, since the sample is never contacted physically in the measurements.

The interferometer can be configured as a Mach-Zehnder interferometer and the same information derived from the interferogram and optical sources other than a multimode laser diode can be used as mentioned above, such as, superluminescence laser diodes, LED's, rare-earth doped fiber lasers and a very broad spectrum source, such as a tungsten filament lamp used with a monochromator with the appropriate slit width, can be used. Various variations on the recording of the interferogram can be used.

It is apparent to one skilled in the art that arrangements of lenses and beamsplitters and reflectors in a conventional Michelson interferometer could be substituted for the above disclosed arrangement of FIG. 13 without departing from the spirit and scope of this inventive concept.

Obviously many modifications and variations of the present invention are possible in the light of the above teachings. It is therefore to be understood that within the scope of the appended claims, the invention may be practiced otherwise than as specifically described.

We claim:

1. An optical system for characterizing parameters of an optical waveguide having a front partially reflective surface and a back partially reflective surface comprising:

an optical source emitting partially coherent wave packets having a central emission wavelength $\lambda_o$ with a predetermined coherence length $l_c$ related to the width of its spectral energy wavelength distribution $\delta\lambda$ by the relation $l_c = \lambda_o^2/\delta\lambda$;

a coupler probe coupled to said optical source disposed to emit said partially coherent wave packets at said predetermined coherence length at said optical waveguide and to receive reflected said partially coherent wave packets from said front partially reflective surface and said back partially reflective surface;

a Michelson interferometer coupled to receive said reflected said partially coherent wave packets from said front partially reflective surface and said back partially reflective surface including optical components defining two optical paths that respectively transmit said reflected said partially coherent wave packets from said front partially reflective surface and said back partially reflective surface, said optical paths each having a length that differs one from the other by an amount $\Delta p$ having a maximum value of $l_c$ to assure the creation of interference signals representative of interference therebetween; and an indicator of said interference coupled to said Michelson interferometer to receive said interference signals to thereby assure characterizing said parameters of said optical waveguide, said coherence length does not exceed a round trip optical path length in said optical waveguide which is equal to $2nl$ where $l$ is the distance between said front partially reflective surface and said back partially reflective surface and $n$ is the refractive index of said optical waveguide and said characterizing is at least one of said parameters of absolute attenuation, effective refractive index, changes of these parameters with the application of a modulation voltage or an external disturbance, as well as providing the effects of interactions between absolute attenuation and effective refractive index with the application of an external disturbance.

2. An apparatus according to claim 1 in which said coupler probe includes a length of fiber and lens capable of being placed near said optical waveguide to permit selective said characterizing at least one location during a processing procedure.

3. An apparatus according to claim 1 or 2 in which said Michelson interferometer includes a displaceable reflective surface for changing the length of at least one of said two optical paths in said optical components to assure said creation of said interference signals.

4. An apparatus according to claim 3 in which said displaceable reflective surface is displaced by a repetitive ramp voltage from a ramp voltage generator for said changing said length of said two optical paths in a predetermined fashion.

5. An apparatus according to claim 4 in which said indicator includes a detector and an optional oscilloscope/computer readout for providing an interferogram being a function of said interference signals and said repetitive ramp voltage.

6. An apparatus according to claim 5 in which said oscilloscope/computer readout has the capability for providing a comparison of successive said interference signals with respect to said repetitive ramp voltages to thereby permit said characterizing said parameters 7. An apparatus according to claim 6 in which said Michelson interferometer includes a bidirectional fiber coupler connected to said probe.

8. An apparatus according to claim 7 in which said Michelson interferometer includes a retroreflector.

9. An apparatus according to claim 7 in which said Michelson interferometer includes a beamsplitter.

10. A method of characterizing parameters of an optical waveguide having a front partially reflective surface and a back partially reflective surface comprising:

emitting partially coherent wave packets from an optical source having a central emission wavelength $\lambda_o$ with a predetermined coherence length $l_c$ related to the width of its spectral energy wavelength distribution $\delta\lambda$ by the relation $l_c = \lambda_o^2/\delta\lambda$, said emitting is such that said coherence length does not exceed a round trip optical path length in said optical waveguide which is equal to $2nl$ where $l$ is the distance between said front partially reflective surface and said back partially reflective surface and $n$ is the refractive index of said optical waveguide;

emitting said partially coherent wave packets from a coupler probe coupled to said optical source onto said optical waveguide;

receiving reflected said partially coherent wave packets via said coupler probe from said front partially reflective surface and said back partially reflective surface;

coupling said reflected said partially coherent wave packets from said front partially reflective surface and said back partially reflective surface to a Michelson interferometer including optical components defining two optical paths that respectively transmit said reflected said partially coherent wave packets of said front partially reflective surface and said back partially reflective surface;

creating interference signals in said Michelson interferometer that are representative of interference between said reflected said partially coherent wave packets energy from said front partially reflective surface and said back partially reflective surface in said two optical paths, said two optical paths each have a length that differs one from the other by an amount $\Delta p$ having a maximum value of $l_c$; and indicating said interference by an indicator coupled to receive said interference signals to thereby assure characterizing said parameters of said optical waveguide, said characterizing is at least one of said parameters of absolute attenuation, effective refractive index, changes of these parameters with the application of a modulation voltage or an external disturbance, as well as providing the effects of interactions between absolute attenuation and effective refractive index with the application of an external disturbance.

11. An method according to claim 10 further including:

providing a length of fiber and lens in said coupler probe to assure being able to be placed near said optical waveguide to permit selective said characterizing at least one location during a processing procedure.

12. A method according to claim 10 or 11 further including:

displacing a reflective surface in said Michelson interferometer to change the length of at least one of said two optical paths in said optical components to assure said creation of said interference signals.

13. A method according to claim 12 further including:

coupling a repetitive ramp voltage from a ramp voltage generator to the displaceable reflective surface to change said length of said two optical paths in a predetermined fashion.

14. A method according to claim 13 further including:

including a detector and an optional oscilloscope/computer readout for providing at least one interferogram which is a function of said interference signals and said repetitive ramp voltage.

15. A method according to claim 14 further including:

comparing successive said interference signals with respect to said repetitive ramp voltages in said oscilloscope/computer readout to thereby permit said characterizing said parameters.

16. An apparatus according to claim 15 in which said Michelson interferometer includes a bidirectional fiber coupler connected to said probe.

17. An optical system for characterizing parameters of an optical waveguide having a front partially reflective surface and a back partially reflective surface comprising:

an optical source emitting partially coherent wave packets having a central emission wavelength $\lambda_o$ with a predetermined coherence length $l_c$ related to the width of its spectral energy wavelength distribution $\delta\lambda$ by the relation $l_c = \lambda_o^2/\delta\lambda$ said coherence length does not exceed a round trip optical path length in said optical waveguide which is equal to $2nl$ where $l$ is the distance between said front partially reflective surface and said back partially reflective surface and $n$ is the refractive index of said optical waveguide;

a coupler probe coupled to said optical source disposed to emit said partially coherent wave packets at said predetermined coherence length at said optical waveguide and to receive reflected said partially coherent wave packets from said front partially reflective surface and said back partially reflective surface, said coupler probe includes a length of fiber and lens capable of being placed near said optical waveguide to permit selective said characterizing at least one location during a processing procedure;

a Michelson interferometer coupled to receive said reflected said partially coherent wave packets from said front partially reflective surface and said back partially reflective surface including optical components defining two optical paths that respectively transmit said reflected said partially coherent wave packets from said front partially reflective surface and said back partially reflective surface, said optical paths each having a length that differs one from the other by an amount $\Delta p$ having a maximum value of $l_c$ to assure the creation of interference signals representative of interference therebetween; and an indicator of said interference coupled to said Michelson interferometer to receive said interference signals to thereby assure said characterizing said parameters of said optical waveguide, said characterizing is at least one of said parameters of absolute attenuation, effective refractive index, changes of these parameters with the application of a modulation voltage or an external disturbance, as well as providing the effects of interactions between absolute attenuation and effective refractive index with the application of an external disturbance, multiple reflections of said partially coherent energy between said front partially reflective surface and said back partially reflective surface are provided and coupled into said optical paths so that each multiple reflection of said partially coherent energy has a length that differs one from the other by an amount $\Delta p$ having a maximum value of $l_c$ to assure the creation of said interference signals representative of said interference therebetween to aid in said characterization of said parameters of absolute attenuation, effective refractive index, changes of these parameters with the application of a modulation voltage or an external disturbance, as well as providing the effects of interactions between absolute attenuation and effective refractive index with the application of an external disturbance.

18. An apparatus according to claim 17 in which said Michelson interferometer includes a displaceable reflective surface for changing the length of at least one of said two optical paths in said optical components to assure said creation of said interference signals.

19. An apparatus according to claim 18 in which said displaceable reflective surface is displaced by a repetitive ramp voltage from a ramp voltage generator for said changing said length of said two optical paths in a predetermined fashion.

20. An apparatus according to claim 19 in which said indicator includes a detector and an optical oscilloscope/computer readout for providing an interferogram being a function of said interference signals and said repetitive ramp voltage.

21. An apparatus according to claim 20 in which said oscilloscope/computer readout has the capability for providing a comparison of successive said interference signals with respect to said repetitive ramp voltages to thereby permit said characterizing said parameters.

22. An apparatus according to claim 21 in which said Michelson interferometer includes a bidirectional fiber coupler connected to said probe.

23. An apparatus according to claim 22 in which said Michelson interferometer includes a retroreflector.

24. An apparatus according to claim 22 in which said Michelson interferometer includes a beamsplitter.

25. A method of characterizing parameters of an optical waveguide having a front partially reflective surface and a back partially reflective surface comprising:

emitting partially coherent wave packets from an optical source having a central emission wavelength $\lambda_o$ with a predetermined coherence length $l_c$ related to the width of its spectral energy wavelength distribution $\delta\lambda$ by the relation $l_c = \lambda_0^2/\delta\lambda$, said emitting is such that said coherence length does not exceed a round trip optical path length in said optical waveguide which is equal to 2nl where l is the distance between said front partially reflective surface and said back partially reflective surface and n is the refractive index of said optical waveguide;

emitting said partially coherent wave packets from a coupler probe coupled to said optical source onto said optical waveguide providing a length of fiber and lens in said coupler waveguide to permit selective said characterizing at least one location during a processing procedure;

receiving reflected said partially coherent wave packets via said coupler probe from said front partially reflective surface and said back partially reflective surface;

coupling said reflected said partially coherent wave packets from said front partially reflective surface and said back partially reflective surface to a Michelson interferometer including optical components defining two optical paths that respectively transmit said reflected said partially coherent wave packets of said front partially reflective surface and said back partially reflective surface;

creating interference signals in said Michelson interferometer that are representative of interference between said reflected said partially coherent wave packets energy from said front partially reflective surface and said back partially reflective surface in said two optical paths, said two optical paths each have a length that differs one from the other by an amount $\Delta p$ having a maximum value of $l_c$;

indicating said interference by an indicator coupled to receive said interference signals to thereby assure said characterizing said parameters of said optical waveguide, said characterizing is at least one of said parameters of absolute attenuation, effective refractive index, changes of these parameters with the application of a modulation voltage or an external disturbance, as well as providing the effects of interactions between absolute attenuation and effective refractive index with the application of an external disturbance; and multiple reflecting said partially coherent wave packets between said front partially reflective surface and said back partially reflective surface and coupling successive multiple reflections into said optical paths so that each said multiple reflection of said partially coherent wave packets has a length that differs one from the other by an amount $\Delta p$ having a maximum value of $l_c$ to assure the creation of said interference signals representative of said interference therebetween to aid in said characterization of said parameters of absolute attenuation, effective refractive index, changes of these parameters with the application of an external disturbance, as well as providing the effects of interactions between absolute attenuation and effective refractive index with the application of a modulation voltage or an external disturbance.

26. A method according to claim 25 further including:

displacing a reflective surface in said Michelson interferometer to change the length of at least one of said two optical paths in said optical components to assure said creation of said interference signals.

27. A method according to claim 26 further including:

coupling a repetitive ramp voltage from a ramp voltage generator to the displaceable reflective surface to change said length of said two optical paths in a predetermined fashion.

28. A method according to claim 27 further including:

a detector and an optical oscilloscope/computer readout for providing at least one interferogram which is a function of said interference signals and said repetitive ramp voltage.

29. A method according to claim 28 further including:

comparing successive said interference signals with respect to said repetitive ramp voltages in said oscilloscope/computer readout to thereby permit said characterizing said parameters.

30. An apparatus according to claim 29 in which said Michelson interferometer includes a bidirectional fiber coupler connected to said probe.

* * * * *